(12) United States Patent
Lee et al.

(10) Patent No.: US 9,978,280 B2
(45) Date of Patent: May 22, 2018

(54) DRIVER ASSISTANCE APPARATUS AND VEHICLE INCLUDING THE SAME

(71) Applicant: LG ELECTRONICS INC., Seoul (KR)

(72) Inventors: Eunkoo Lee, Seoul (KR); Sukjin Chang, Seoul (KR); Kihyeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/208,761

(22) Filed: Jul. 13, 2016

(65) Prior Publication Data
US 2017/0140651 A1    May 18, 2017

(30) Foreign Application Priority Data
Nov. 18, 2015 (KR) .......................... 10-2015-0162089

(51) Int. Cl.
| | |
|---|---|
| *B60Q 1/00* | (2006.01) |
| *G08G 1/16* | (2006.01) |
| *B60Q 1/34* | (2006.01) |
| *B60Q 1/50* | (2006.01) |
| *G01C 21/36* | (2006.01) |

(52) U.S. Cl.
CPC .............. *G08G 1/166* (2013.01); *B60Q 1/34* (2013.01); *B60Q 1/50* (2013.01); *G01C 21/365* (2013.01); *G08G 1/167* (2013.01); *B60Q 2400/50* (2013.01)

(58) Field of Classification Search
None
See application file for complete search history.

(56) References Cited

U.S. PATENT DOCUMENTS

| | | | |
|---|---|---|---|
| 7,095,318 B1 * | 8/2006 | Bekhor .................. | B60Q 1/503 340/464 |
| 7,791,458 B2 | 9/2010 | Shimaoka et al. | |
| 7,862,177 B2 * | 1/2011 | Kubota .................... | B60Q 1/50 250/221 |
| 2003/0147247 A1 * | 8/2003 | Koike .................... | B60Q 1/484 362/464 |

(Continued)

FOREIGN PATENT DOCUMENTS

| | | |
|---|---|---|
| DE | 102012219572 A1 | 4/2014 |
| DE | 102013012891 A1 | 2/2015 |

(Continued)

*Primary Examiner* — Thomas McCormack
(74) *Attorney, Agent, or Firm* — Birch, Stewart, Kolasch & Birch, LLP

(57) ABSTRACT

A driver assistance apparatus in a vehicle, and including a sensor configured to detect obstacles around the vehicle; a plurality of indicator output units disposed at different positions on the vehicle; and a processor configured to detect an obstacle around the vehicle and a positional relationship between the vehicle and the obstacle, selectively control the indicator output units to display an indicator outside the vehicle at a position and with a display characteristic, based on the detected positional relationship, detect the positional relationship between the vehicle and the obstacle changing, and selectively control the indicator output units to change at least one of the position and the display characteristic of the indicator based on the changing positional relationship.

20 Claims, 44 Drawing Sheets

(56) References Cited

U.S. PATENT DOCUMENTS

| | | | |
|---|---|---|---|
| 2005/0117364 A1* | 6/2005 | Rennick | B60R 1/1207 362/540 |
| 2006/0290482 A1* | 12/2006 | Matsumoto | B60Q 1/2665 340/436 |
| 2007/0182527 A1* | 8/2007 | Traylor | B60Q 9/008 340/435 |
| 2007/0222574 A1* | 9/2007 | Courts | B60Q 1/24 340/468 |
| 2011/0128141 A1* | 6/2011 | Purks | B60Q 1/38 340/475 |
| 2014/0236483 A1 | 8/2014 | Beaurepaire et al. | |
| 2015/0158428 A1* | 6/2015 | Beggs | B60Q 1/2673 340/436 |
| 2015/0203023 A1* | 7/2015 | Marti | B60Q 1/00 340/425.5 |
| 2016/0207443 A1* | 7/2016 | Widdowson | B60Q 1/0011 |

FOREIGN PATENT DOCUMENTS

| | | |
|---|---|---|
| EP | 2896937 A1 | 7/2015 |
| JP | 2008-143510 A | 6/2008 |
| KR | 10-2013-0006067 A | 1/2013 |
| KR | 10-2013-0006071 A1 | 1/2013 |
| KR | 10-2013-0084173 A | 7/2013 |

* cited by examiner (a)

(e)

GETTING OFF
(i)

(b)

NO PASSING
(f)

(j)

(c)

USE BYPASS
(g)

(k)

(d)

LANE CHANGE
(h)

(l)

DRIVER ASSISTANCE APPARATUS AND VEHICLE INCLUDING THE SAME

CROSS-REFERENCE TO RELATED APPLICATIONS

The present application claims priority under 35 U.S.C. 119 and 35 U.S.C. 365 to Korean Patent Application No. 10-2015-0162089 filed on 18 Nov., 2015, which is hereby incorporated by reference in its entirety.

TECHNICAL FIELD

The present disclosure relates to a driver assistance apparatus in a vehicle, and a vehicle including the driver assistance apparatus.

BACKGROUND

A vehicle is an apparatus that moves a user in a direction in which he or she wants to go. A representative example of the vehicle may be a car. Cars are classified into an internal combustion engine car, an external combustion engine car, a gas turbine car, and an electric vehicle according to a used motor.

The electric vehicle operates an electric motor by using electricity as energy, and includes a pure electric vehicle, a hybrid electric vehicle (HEV), a plug-in hybrid electric vehicle (PHEV), a fuel cell electric vehicle (FCEV) or the like. An intelligent vehicle is also being actively developed for the safety or convenience of a driver, a pedestrian or the like.

The intelligent vehicle is a stat-of-the-art vehicle to which an information technology (IT) has been applied, and is also referred to as a smart vehicle. The intelligent vehicle provides the optimal traffic efficiency through introduction of the state-of-the-art system of a vehicle itself and a link to an intelligent transport system (ITS).

In particular, the intelligent vehicle has a technical advantage in that the safety of a pedestrian as well as a driver or a passenger is maximized due to the development of core technologies related to safety, such as an obstacle detector, a collision detector or reducer, or the like. However, since the current technologies are limited to the technology of a vehicle itself, such as notifying a vehicle driver of the detected surrounding situation or vehicle control reflecting the surrounding situation, there is a limitation in that it is difficult to prevent accidents related to pedestrians or other vehicles outside.

SUMMARY

Accordingly, one aspect of the present invention is to provide a driver assistance apparatus that displays the optimal indicator inside or outside the vehicle according to the detected surrounding situation, and a vehicle including the driver assistance apparatus.

To achieve these and other advantages and in accordance with the purpose of the present invention, as embodied and broadly described herein, the present invention provides in one aspect a driver assistance apparatus in a vehicle, the driver assistance apparatus comprising a sensor configured to detect obstacles around the vehicle; a plurality of indicator output units disposed at different positions on the vehicle; and a processor configured to detect an obstacle around the vehicle and a positional relationship between the vehicle and the obstacle, selectively control the indicator output units to display an indicator outside the vehicle at a position and with a display characteristic, based on the detected positional relationship, detect the positional relationship between the vehicle and the obstacle changing, and selectively control the indicator output units to change at least one of the position and the display characteristic of the indicator based on the changing positional relationship.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Figure 1:
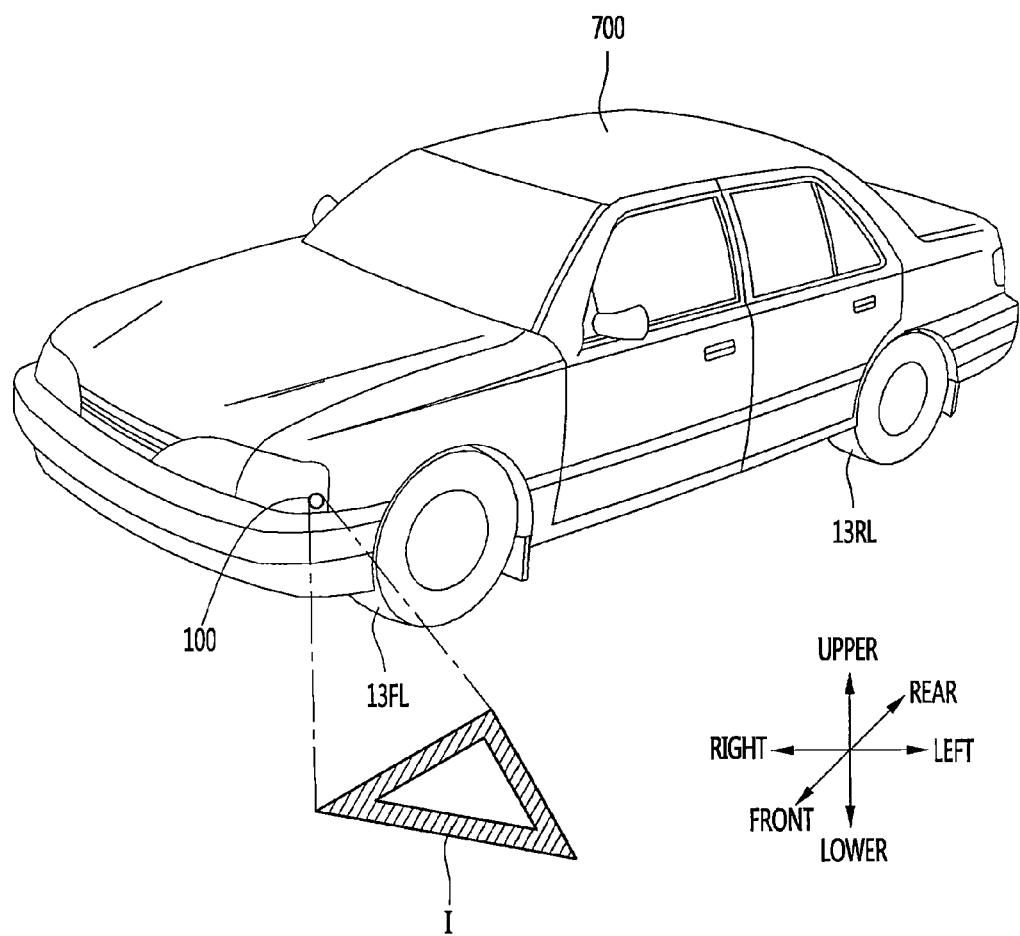
FIG. 1 represents the exterior of a vehicle that includes a driver assistance apparatus according to an embodiment.

Hereinafter, embodiments are described in detail with reference to the accompanying drawings and regardless of the numbers of the drawings, same or similar components are assigned with the same reference numerals and thus repetitive descriptions for those are omitted. Since the suffixes "module" and "unit" for components used in the following description are given and interchanged for easiness in making the present disclosure, they do not have distinct meanings or functions. Also, the accompanying drawings are used to help easily understanding embodiments disclosed herein but the technical idea disclosed in the present disclosure is not limited thereto. It should be understood that all of variations, equivalents or substitutes contained in the concept and technical scope of the inventive concept are also included.

Although the terms 'first' and 'second' may be used to describe various components, these components should not be limited to these terms. The terms are used only in order to distinguish a component from another component. When it is mentioned that any component is "connected" or "accessed" to another component, it should be understood that the former can be directly connected to the latter, or there may be another component in between. On the contrary, when any component is referred to as being 'directly connected' or 'directly accessed' to another component, it should be understood that there may be no other component in between.

The terms in singular form include the plural form unless otherwise specified. It should be understood that the term "includes" or "has" indicates the presence of characteristics, numbers, steps, operations, components, parts or combinations thereof represented in the present disclosure but does not exclude the presence or addition of one or more other characteristics, numbers, steps, operations, components, parts or combinations thereof.

A vehicle discussed in the present disclosure may include a car or motorcycle. In the following, the car of the vehicle is mostly discussed. The vehicle discussed in the present disclosure include all of an internal combustion engine vehicle that includes an engine as a power source, a hybrid vehicle that includes an engine and an electrical motor as a power source, and an electrical vehicle that includes an electrical motor as a power source.

In the following description, the right side of the vehicle means the left side of the driving direction of the vehicle and the right side of the vehicle means the right side of the driving direction of the vehicle. In the following description, a left hand drive (LHD) vehicle is mostly described unless mentioned to the contrary. In the following, a driver assistance apparatus according to an embodiment is described in detail with reference to the accompanying drawings.

Referring to FIG. 1, a vehicle 700 according to an embodiment includes wheels 13FL and 13RL that rotate by a power source, and a driver assistance apparatus. In an embodiment, the driver assistance apparatus is a separate apparatus and may perform an indicator display function by transmitting and receiving required information through data communication with the vehicle 700. Also, it is possible to define some of the units of the vehicle 700 as the driver assistance apparatus.

When the driver assistance apparatus 100 is the separate apparatus, at least some of the units (see FIG. 2) of the driver assistance apparatus 100 can be the units of the vehicle 700 or of another apparatus loaded in the vehicle 700. In addition, by transmitting and receiving data through an interface unit 130 of the driver assistance apparatus 100, these units may be understood to be included in the driver assistance apparatus 100.

Figure 2:
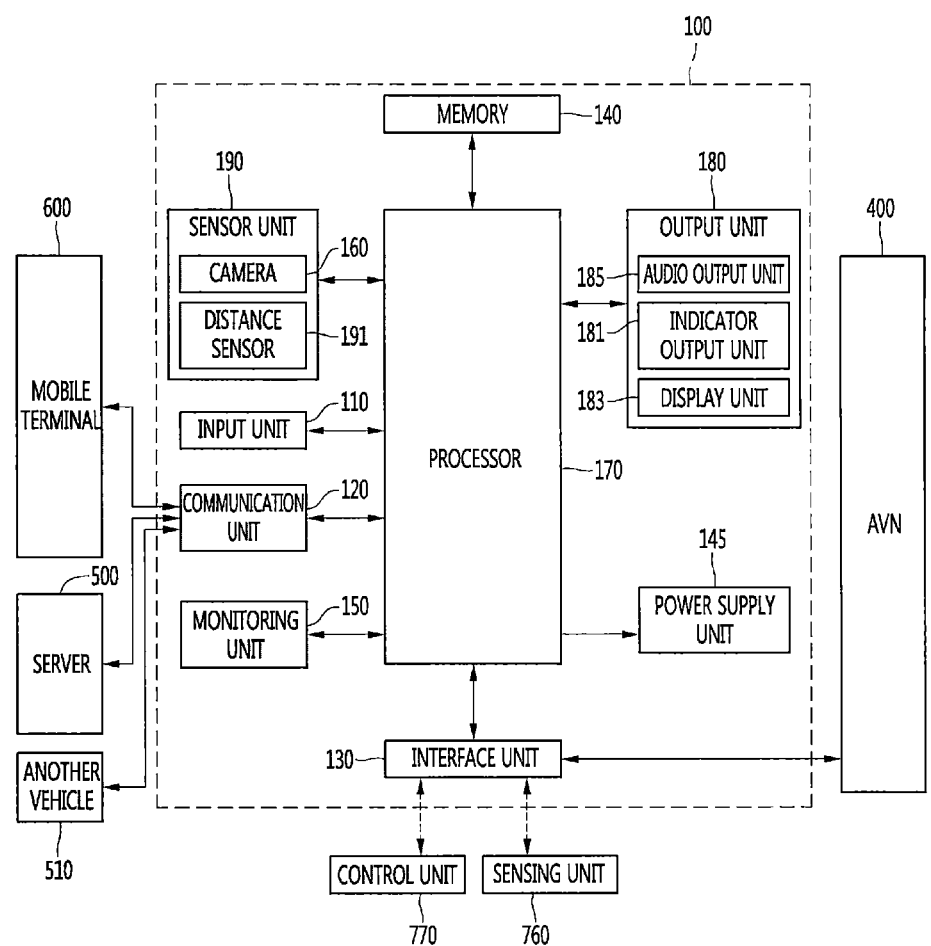
FIG. 2 represents a block diagram of a driver assistance apparatus according to an embodiment.

For the convenience of description, it is described below that the driver assistance apparatus 100 directly includes the units shown in FIG. 2. The driver assistance apparatus 100 can determine an indicator I and an indicator display method according to a notification situation and a positional relationship with a notification target when detecting that there is an object around a vehicle and a notification situation, output the indicator I according to the determined method, notify the outside of a dangerous situation to prevent an accident, and ask for cooperation to enable a driver to smoothly drive.

In particular, the driver assistance apparatus 100 can change the indicator display method according to a variation in positional relationship to enhance indicator I identification level to accurately deliver a notification to the other party, when a notification target moves or the present vehicle 700 moves and thus the positional relationship between the present vehicle 700 and the notification target varies.

Here, the notification target is at least one of detected objects and may include another vehicle, a pedestrian, a two-wheeled vehicle, such as a bicycle or motorcycle, or the like. Also, the notification situation may include a getting-out situation, a moving-backward situation, a stop situation, an interchange entrance situation, a collision risk detection situation, or the like.

Also, the positional relationship with the notification target include position related information, such as the distance between the present vehicle 700 and the notification target, the direction of arrangement, a direction in which an object moves, a direction in which the present vehicle moves, or the like. Also, the indicator display method refers to various methods of determining an indicator's position, size, brightness, saturation, color, phase and indicator image, or the like to display the indicator outside the vehicle.

In the following, each of the units that configure the driver assistance apparatus for executing such an indicator display function is described in detail with reference to FIGS. 2 to 10. Referring to FIG. 2, such a driver assistance apparatus 100 can include an input unit 110, a communication unit 120, the interface unit 130, a memory 140, a monitoring unit 150, a sensor unit 190, a processor 170, a display unit 180, an audio output unit 185, and a power supply unit 190.

However, the driver assistance apparatus 100 described in the present disclosure may have more or less components than those enumerated above. In order to describe the configuration, firstly, the driver assistance apparatus 100 can include the input unit 110 that detects a user's input.

For example, a user can set the indicator display function of the driver assistance apparatus or turn on/off the power supply of the driver assistance apparatus 100, through the input unit 110. Such an input unit 110 includes at least one of a gesture input unit (e.g., an optical sensor) that detects a user gesture, a touch input unit (e.g., a touch sensor, a touch key, or a mechanical key) that detects a touch, and a microphone that detects a voice input, and may detect a user input.

Next, the driver assistance apparatus 100 can include the communication unit 120 that communicates with another vehicle 510, a terminal 600, a server 500, or the like. The driver assistance apparatus 100 can receive at least one of pieces of navigation information, another vehicle's travel information, and traffic information through the communication unit 120. In addition, the information that the communication unit 120 has received may be used as additional information for determining a notification situation or detecting the positional relationship with the notification target.

Also, the driver assistance apparatus 100 can use data from the server 500 in order to extract an indicator according to the notification situation through the communication unit 120. In particular, the driver assistance apparatus 100 can transmit information on the detected notification situation to the server 500 and receive an indicator image found according to the notification situation to determine an image of an indicator to be displayed outside the vehicle.

Also, the driver assistance apparatus 100 can receive, from the communication unit 120, an indicator display request transmitted by the other vehicle 510 and thus display an indicator. Further, the driver assistance apparatus 100 can transmit the indicator display request to the other vehicle 510 or a traffic system (e.g., a traffic light) through the communication unit 120 to enable the other vehicle 510 or the traffic system to display an indicator.

The communication unit 120 may further receive at least one of pieces of position information, weather information, and road traffic information (e.g., transport protocol expert group (TPEG) information) from the mobile terminal 600 and/or the server 500, and receive traffic information from the server 500 that includes an intelligent transport system (ITS). Here, the traffic information may include traffic light information, lane information or the like.

The communication unit 120 can also receive navigation information from the server 500 and/or the mobile terminal 600. Here, the navigation information may include at least one of pieces of map information relating to vehicle travel, lane information, position information on the vehicle, preset destination information, and route information depending on a destination.

In particular, the communication unit 120 can receive the real-time position of the vehicle 700 by navigation information. For, example, the communication unit 120 can include a global positioning system (GPS) module or a wireless fidelity (WiFi) module to obtain the position of a vehicle. The communication unit 120 can receive, from the other vehicle, travel information on the other vehicle 510 and transmit travel information on the vehicle 700 to share travel information with vehicles.

Here, vehicle travel information that is shared can include at least one of pieces of direction information, position information, vehicle speed information, acceleration information, travel route information, forward/backward movement information, adjacent vehicle information, and turn signal information. Also, when a user gets in the vehicle 700, the mobile terminal 600 of the user and the driver assistance apparatus 100 can also perform pairing automatically or by the execution of an application by the user.

The communication unit 120 can exchange data with the other vehicle 510, the mobile terminal 600 or the server 500 wirelessly. Specifically, the communication unit may perform wireless communication by using wireless data communication. The wireless data communication may use technical standards or communication techniques for mobile communication (e.g., global system for mobile communication (GSM), code division multi access (CDMA), code division multi access 2000 (CDMA2000), enhanced voice-data optimized or enhanced voice-data only (EV-DO), wide-band CDMA (WCDMA), high speed downlink packet access (HSDPA), high speed uplink packet access (HSUPA), long term evolution (LTE), long term evolution-advanced (LTE-A)).

The communication unit 120 can use a wireless internet technology, which can include e.g., wireless LAN (WLAN), Wi-Fi, Wi-Fi Direct, digital living network alliance (DLNA), wireless broadband (WiBro), world interoperability for microwave access (WiMAX), HSDPA, HSUPA, LTE, LTE-A, etc.

The communication unit 120 can use short-range communication and may support short-range communication by using at least one of e.g., Bluetooth™, radio frequency identification (RFID), infrared data association (IrDA), ultra wideband (UWB), ZigBee, near field communication (NFC), Wi-Fi, Wi-Fi Direct, and wireless universal serial bus (wireless USB) technologies. The driver assistance apparatus 100 can use the short range communication to perform pairing with a mobile terminal in a vehicle, and use a wireless communication module in a mobile terminal to exchange data with another vehicle and a server wirelessly.

Next, the driver assistance apparatus 100 can include the interface unit 130 that receives vehicle related data or transmits a signal processed or generated by the processor 170 to the outside. Specifically, the driver assistance apparatus 100 can receive at least one of pieces of navigation information and sensor information through the interface unit 130.

In addition, the navigation information and the sensor information may be used as additional information for determining a notification situation and detecting the positional relationship with a notification target. The driver assistance apparatus 100 can transmit, through the interface unit 130, a control signal for executing a driver assistance function or information generated by the driver assistance apparatus 100.

Thus, the interface unit 130 can perform data communication with at least one of the control unit 770, an audio video navigation (AVN) device 400 and the sensing unit 760 inside the vehicle through wired or wireless communication. Specifically, the interface unit 130 can receive navigation information through data communication with the control unit 770, the AVN device 400 and/or a separate navigation device.

The interface unit 130 can also receive sensor information from the control unit 770 or the sensing unit 760. Here, the sensor information can include at least one of pieces of vehicle 700 direction information, position information, vehicle speed information, acceleration information, tilt information, forward/backward movement information, fuel information, information on the distance to the front and rear vehicles, information on the distance between a vehicle and a lane, and turn signal information.

The sensor information may be acquired from a heading sensor, a yaw sensor, a gyro sensor, a position module, a vehicle's forward/backward movement sensor, a wheel sensor, a vehicle speed sensor, a vehicle-body tilt sensor, a battery sensor, a fuel sensor, a tire sensor, a steering sensor by the rotation of a steering wheel, a vehicle's internal temperature sensor, a vehicle's internal humidity sensor, a door sensor, etc. The position module can include a GPS module for GPS information reception.

In addition, the interface unit 130 can receive a user input received through the user input unit 110 of the vehicle 700 or through the control unit 770. That is, when the input unit is disposed as a component inside the vehicle, the user input can be received through the interface unit 130.

The interface unit 130 can also receive traffic information acquired from the server 500. The server 500 may be a server that is located at a traffic control center that controls traffic. For example, when the traffic information is received from the server 500 through the communication unit 120 of the vehicle 700, the interface unit 130 can also receive the traffic information from the control unit 770.

Next, the memory 140 stores various pieces of data for the overall operations of the driver assistance apparatus 100, such as programs for processing or controlling by the processor 170. Specifically, the memory 140 may store many application programs or applications executed on the driver assistance apparatus 100 or data and commands for the operation of the driver assistance apparatus 100. At least some of the application programs may be downloaded from an external server through wireless communication. Also, at least some of the application programs may exist in the driver assistance apparatus 100 for the fundamental functions (e.g., a driver assistance function) of the driver assistance apparatus 100 when the vehicle comes out of the factory.

In addition, the application programs may be stored in the memory 140 and enable the operation (or function) of the driver assistance apparatus 100 to be executed by the processor 170. The memory 140 may store various indicators (See FIG. 8b) to be displayed according to a notification situation. For example, the memory 140 may store, in association with a getting off situation, a virtual door image, a slow driving image, or a caution image that represents the getting off situation. Thus, the driver assistance apparatus 100 can search for an indicator image matching a detected notification situation from the memory 140 to determine an indicator.

The memory 140 may store data for verifying an object in an image. For example, the memory 140 may store data for checking through a certain algorithm what an object is when a certain object is detected from images around the vehicle that are acquired through the camera 160. For example, the memory 140 may store data for checking through a certain algorithm what an object is when the image acquired through the camera 160 includes a certain object, such as a lane, a traffic sign board, a two-wheeled vehicle, or a pedestrian.

The memory 140 can include, as hardware, at least one of various types of storage mediums, including a flash memory type memory, a hard disk type memory, a solid state disk (SSD) type memory, a silicon disk drive (SDD) type memory, a multimedia card micro type memory, a card type memory (e.g., an SD or XD memory), a random access memory (RAM), an static random access memory (SRAM), a read-only memory (ROM), an electrically erasable programmable read-only memory (EEPROM), a programmable read-only memory (PROM), a magnetic memory, a magnetic disk, and an optical disk. The driver assistance apparatus 100 can also operate in conjunction with a web storage that performs the storage function of the memory 140 on the internet.

Next, the monitoring unit 150 may acquire user's biometric information. Specifically, the monitoring unit 150 may sense user's operation or biometric information and acquire monitoring information. In addition, the acquired monitoring information may be used for determining a notification situation. Specifically, the monitoring unit 150 may acquire an image of a user for biometrics. That is, the monitoring unit 150 can include an image acquisition module that is disposed inside the vehicle.

Figure 3:
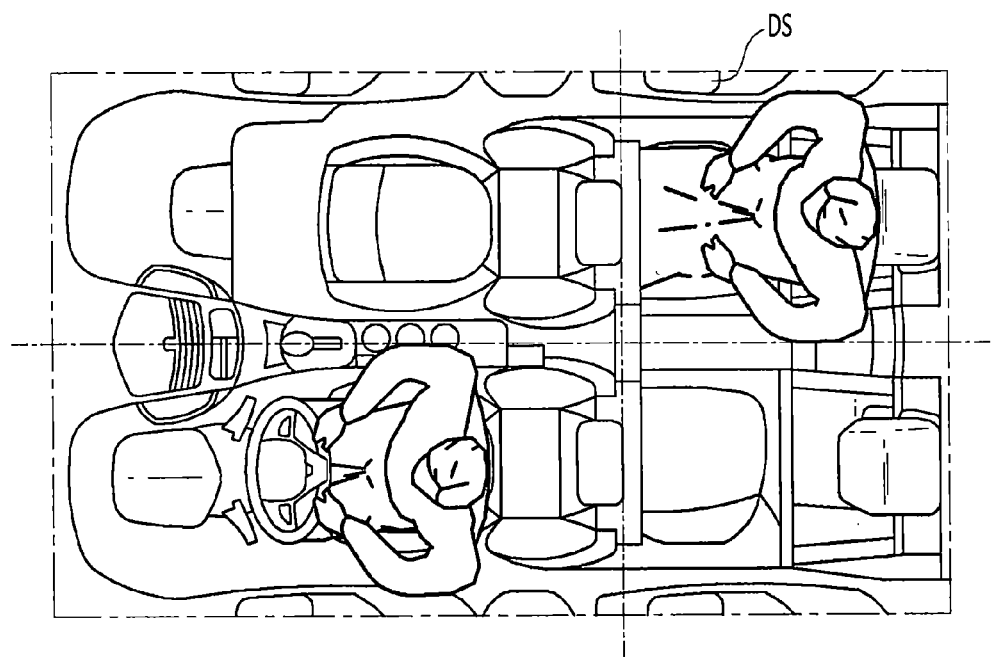
FIG. 3 represents an example of a method of detecting a situation inside a vehicle according to an embodiment.

For example, the monitoring unit 150 can include a monitoring camera that captures an image of the interior of a vehicle, and may thus capture an image of the interior of a vehicle, as shown in FIG. 3. In addition, the processor 170 may perform image-processing on the image of the interior of the vehicle and determine to be a getting-out situation if an operation of opening the door is detected.

The monitoring unit 150 can include a door sensor DS on a door knob to detect a getting-out situation. In addition, the biometric information that the monitoring unit 150 detects can include at least one of pieces of image information including an image of a user, fingerprint information, iris-scan information, retina-scan information, hand geometry information, facial recognition information, and voice recognition information. In addition, the monitoring unit 150 can include a sensor that senses the biometric information.

Next, the driver assistance apparatus 100 can further include a sensor unit 190 that detects an object around a vehicle. In this instance, the driver assistance apparatus 100 can include a separate sensor unit 190 to detect a surrounding object as described earlier and also receive the sensor information obtained by the sensing unit 760 of the vehicle 700 itself, through the interface unit 130.

The sensor unit 190 can include a distance sensor 191 that detects the position of an object. In addition, the distance sensor 191 may precisely detect the direction and distance of the object from the present vehicle 700, and a direction in which the object moves. The distance sensor 191 can also continuously measure a positional relationship with the detected object to accurately detect a variation in positional relationship.

The distance sensor 191 can detect objects before and after the vehicle 700, and on the left and right sides of the vehicle 700. Thus, the distance sensor 191 may be disposed at various positions. Specifically, referring to FIG. 4, the distance sensor 191 can be disposed at least one of positions, such as the front, rear, left and right sides (191a to 191d) and ceiling 191e of the body of the vehicle 700.

The distance sensor 191 can include various distance measurement sensors, such as a lidar sensor, a laser sensor, an ultrasonic sensor, a stereo camera, or the like. For example, the distance sensor may be a laser sensor and measure the positional relationship between the vehicle 700 and the object by using time-of-flight (TOF) and/or phase shift according to a laser signal modulation method. Specifically, the TOF may measure the distance to the object and the direction of arrangement by emitting a pulse laser signal and measuring a time when reflected pulse signals from the objects within a measurement range reach a receiver.

The attribute of the object for determining whether the object corresponds to a notification target and a notification situation can be obtained so the processor 170 analyzes the image captured by the camera 160. Thus, the sensor unit 190 can include a camera 160.

Specifically, the driver assistance apparatus 100 can include the camera 160 that captures images around the vehicle 700. In addition, the obtained image around the vehicle enables the processor 170 to detect an object around a vehicle and the attribute of the object to generate image information. Here, the image information includes at least one piece of information, such as a type of object, traffic signal information that the object shows, the distance between the object and the vehicle, and the position of the object, and may be included in sensor information.

Specifically, the processor 170 can perform object analysis, such as detecting an image from the captured image through image processing, tracking the object, measuring the distance to the object, verifying the object or the like to generate image information. In order for the processor 170 to more easily perform object analysis, the camera 160 may be a stereo camera that captures an image and measures the distance to the object in the captured image. However, the embodiment is not limited thereto.

Figure 4:
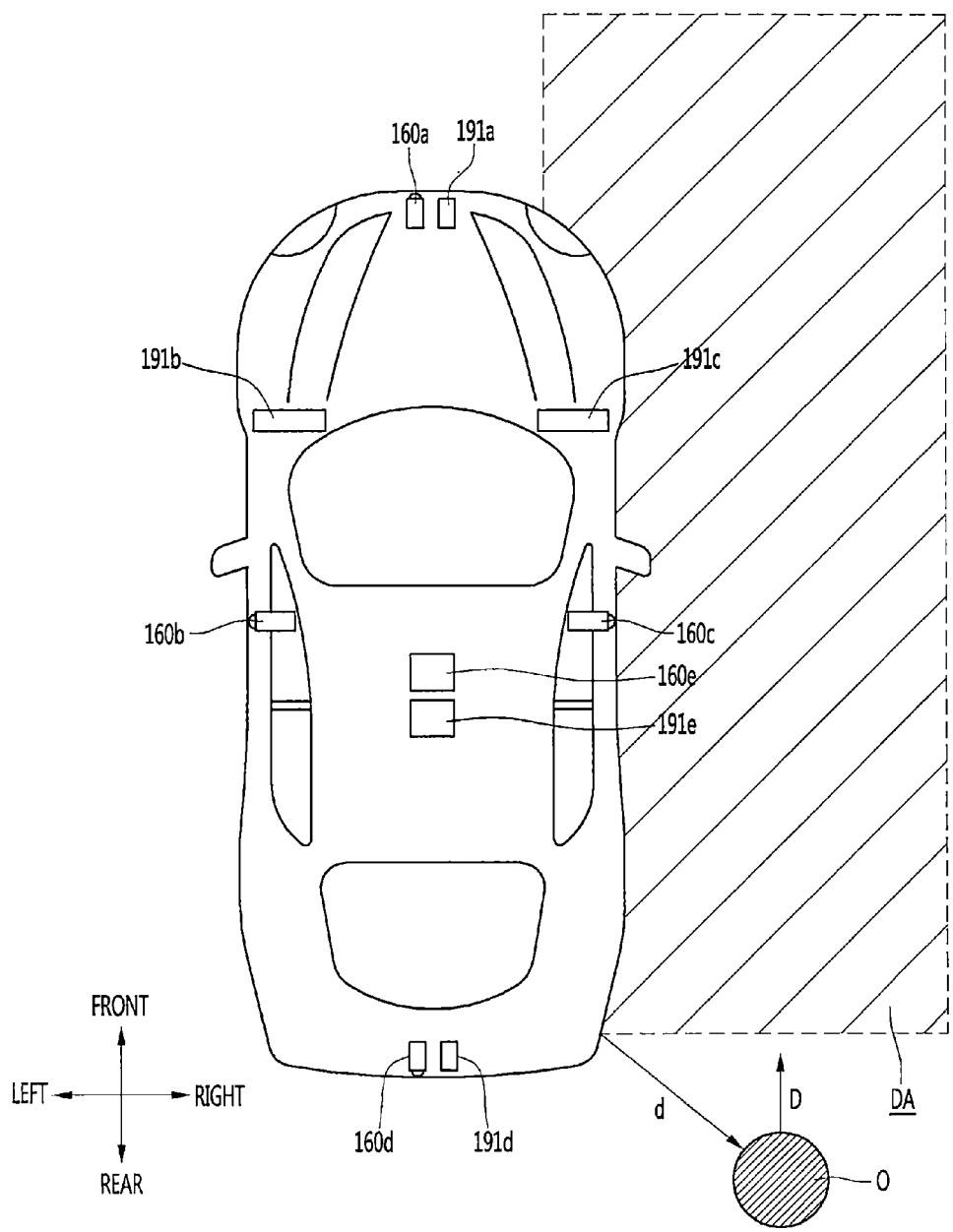
FIG. 4 is a plane view of a vehicle including a sensor unit according to an embodiment of the inventive concept.

The camera 160 may also include an internal camera that captures an image in front of the vehicle inside the vehicle to acquire a front image. The camera 160 may also be disposed at various positions outside the vehicle. Referring to FIG. 4, a plurality of cameras 160 may be disposed at at least one of the left, rear, right, front, and ceiling of the vehicle 700, respectively.

A left camera 160b may be disposed in a casing that surrounds a left side mirror. Alternatively, the left camera 160b may be disposed outside the casing that surrounds the left side mirror. Alternatively, the left camera 160b may be disposed on an area outside a left front door, a left rear door or left fender. A right camera 160c may be disposed in a casing that surrounds a right side mirror. Alternatively, the right camera 160c may be disposed outside the casing that surrounds the right side mirror. Alternatively, the right camera 160c may be disposed on an area outside a right front door, a right rear door or right fender.

Also, a rear camera 160d may be disposed near a rear number plate or trunk switch. A front camera 160a may be disposed near an emblem or radiator grill. The processor 170 can synthesize images captured in all directions to provide an around view image from a top view of the vehicle 700. When the around view image is generated, boundaries are generated among image areas. These boundaries may be naturally displayed by image blending.

Also, a ceiling camera 160e may be disposed on the ceiling of the vehicle 700 to capture image of the front, rear, left and right of the vehicle 700. Such a camera 160 may also include an image sensor and an image processing module. The camera 160 may process a still image or video that is obtained by the image sensor (e.g., CMOS or CCD). The image processing module may process the still image or video obtained by the image sensor to extract necessary image information, and deliver the extracted image information to the processor 170.

In an embodiment, the sensor unit 190 can include a stereo camera that includes the distance sensor 191 and the camera 160. That is, the stereo camera may obtain an image and detect the position of an object. In the following, a method of detecting, by the processor 170, position information and image information by using the stereo camera is described in more detail with reference to FIGS. 5 to 7.

Figure 5:
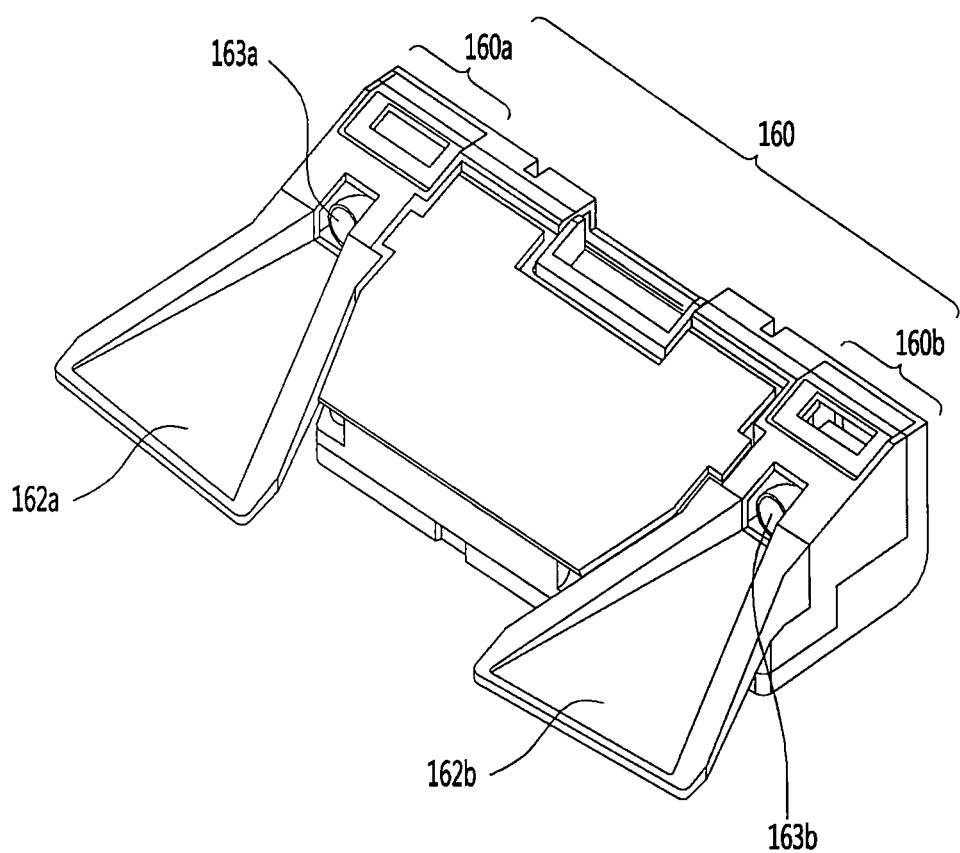
FIG. 5 represents an example of a camera according to an embodiment.

Referring first to FIG. 5, the stereo camera 160 can include a first camera 160a including a first lens 163a, and a second camera 160b including a second lens 163b. The stereo camera 160 may further include a first light shield 162a and a second light shield 162b for preventing light from entering the first lens 163a and the second lens 163b, respectively.

Such a driver assistance apparatus 100 can acquire a stereo image around the vehicle 700 from the first and second cameras 160a and 160b, perform disparity detection based on the stereo image, perform object detection on at least one stereo image based on the disparity information, and after the object detection, continue to track the motion of an object.

Figure 6:
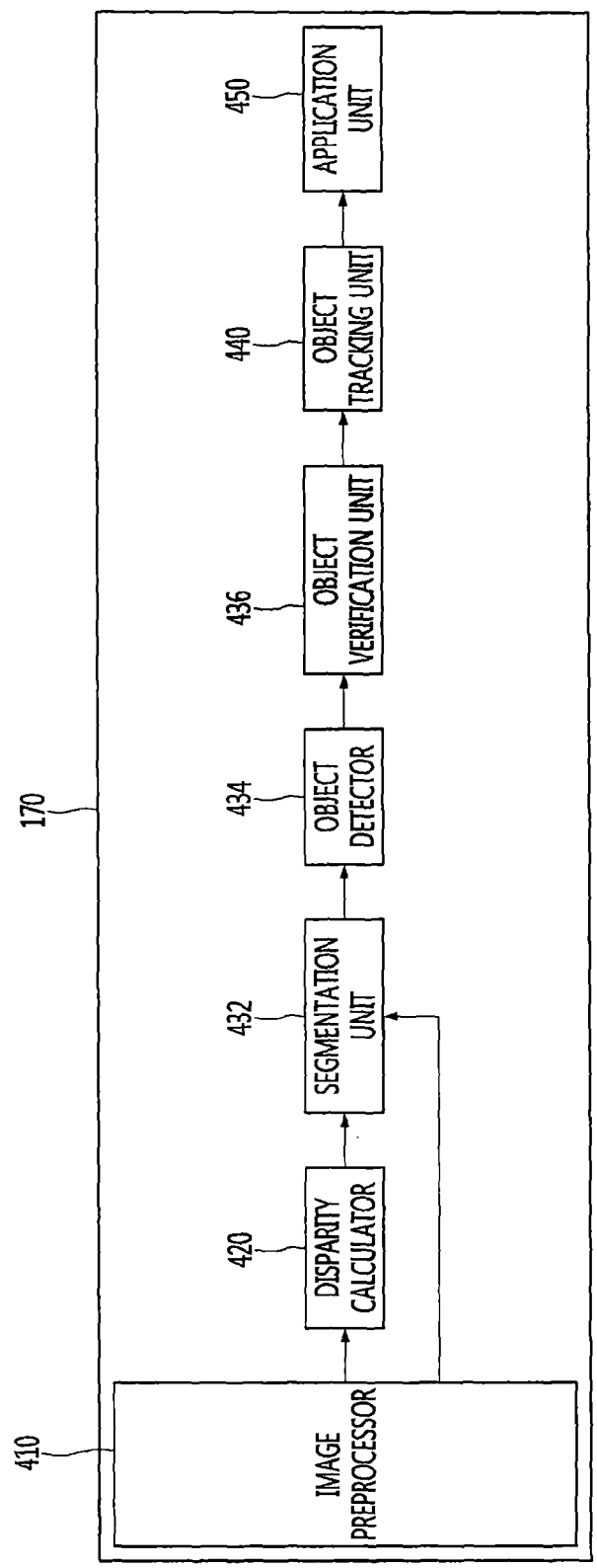
FIGS. 6 and 7 are diagrams illustrating an example of a method of generating image information from an image from a camera according to an embodiment.

FIG. 6 is an example of the internal block diagram of the processor 170 and can include an image preprocessor 410, a disparity calculator 420, an object detector 434, an object tracking unit 440, and an application unit 450. Although in FIG. 5 and the following description, it is described that an image is processed in the order of the image preprocessor 410, the disparity calculator 420, the object detector 434, the object tracking unit 440, and the application unit 450, an embodiment is not limited thereto.

The image preprocessor 410 may receive an image from the camera 160 to perform preprocessing. In particular, the image preprocessor 410 may perform, on the image, noise reduction, rectification, calibration, color enhancement, color space conversion (CSC), interpolation, camera 160 gain control, or the like. Thus, it is possible to acquire an image clearer than a stereo image captured by the camera 160.

The disparity calculator 420 may receive an image signal-processed by the image preprocessor 410, perform stereo matching on the received image, and acquire a disparity map according to stereo matching. That is, it is possible to acquire disparity information on a stereo image in front of a vehicle. In this instance, the stereo matching may be performed on a pixel or predetermined block basis of the stereo images. The disparity map may mean a map that represents, by a numerical value, binocular parallax information on the stereo images, i.e., left and right images.

A segmentation unit 432 may perform segment and clustering on at least one of images based on disparity information from the disparity calculator 420. In particular, the segmentation unit 432 may separate the background from the foreground for at least one of stereo images based on the disparity information.

For example, it is possible to calculate, an area of the disparity map in which the disparity information is less than or equal to a predetermined value, as the background and exclude a corresponding part. Thus, the foreground may be relatively separated. As another example, it is possible to calculate, an area of the disparity map in which the disparity information is equal to or greater than a predetermined value, as the foreground and extract a corresponding part. Thus, the foreground may be separated.

As such, by separating the foreground from the background based on the disparity information extracted based on the stereo image, it is possible to reduce a signal processing speed, a signal processing amount, or the like when an object is detected later.

Next, the object detector 434 may detect an object based on an image segment from the segmentation unit 432. That is, the object detector 434 may detect an object from at least one of images, based on the disparity information. In particular, the object detector 434 may detect an object from at least one of images. For example, it is possible to detect an object from the foreground separated by the image segment.

Next, the object verification unit 436 may classify and verify the separated object. Thus, the object verification unit 436 may use an identification method using a neural network, a support vector machine (SVM) method, an identification method by AdaBoost using Haar-like features, a histograms of oriented gradients (HOG) method, or the like.

The object verification unit 436 may compare objects stored in the memory 140 with detected objects to verify an object. For example, the object verification unit 436 may verify a surrounding vehicle, lane, road surface, signpost, dangerous area, tunnel or the like around a vehicle.

The object tracking unit 440 may perform tracking on the verified object. For example, it is possible to verify objects in acquired stereo images, calculate the motion or motion vector of the verified objects, and track the movement of a corresponding object based on the calculated motion or motion vector, sequentially. Thus, it is possible to track the surrounding vehicle, lane, road surface, signpost, dangerous area, tunnel or the like around the vehicle.

Next, the application unit 450 may calculate the degree of risk of the vehicle based on various objects around the vehicle, such as another vehicle, lane, road surface, signpost or the like. Also, it is possible to calculate collision possibility with the front car, whether the vehicle slips, or the like.

In addition, based on the calculated degree of risk, collision possibility or slipping possibility, the application unit 450 may output, as driver assistance information, a message for notifying a user of such information. Alternatively, it is also possible to generate, a control signal for posture control or driving control of the vehicle, as vehicle control information.

The image preprocessor 410, the disparity calculator 420, the segmentation unit 432, the object detector 434, the object verification unit 436, the object tracking unit 440 and the application unit 450 may be the internal components of the image processor in the processor 170. According to an embodiment, the processor 170 can include only some of the image preprocessor 410, the disparity calculator 420, the segmentation unit 432, the object detector 434, the object verification unit 436, the object tracking unit 440 and the application unit 450. If the camera 160 includes a mono camera 160 or around view camera 160, the disparity calculator 420 may be excluded. According to an embodiment, the segmentation unit 432 may also be excluded.

Figure 7:
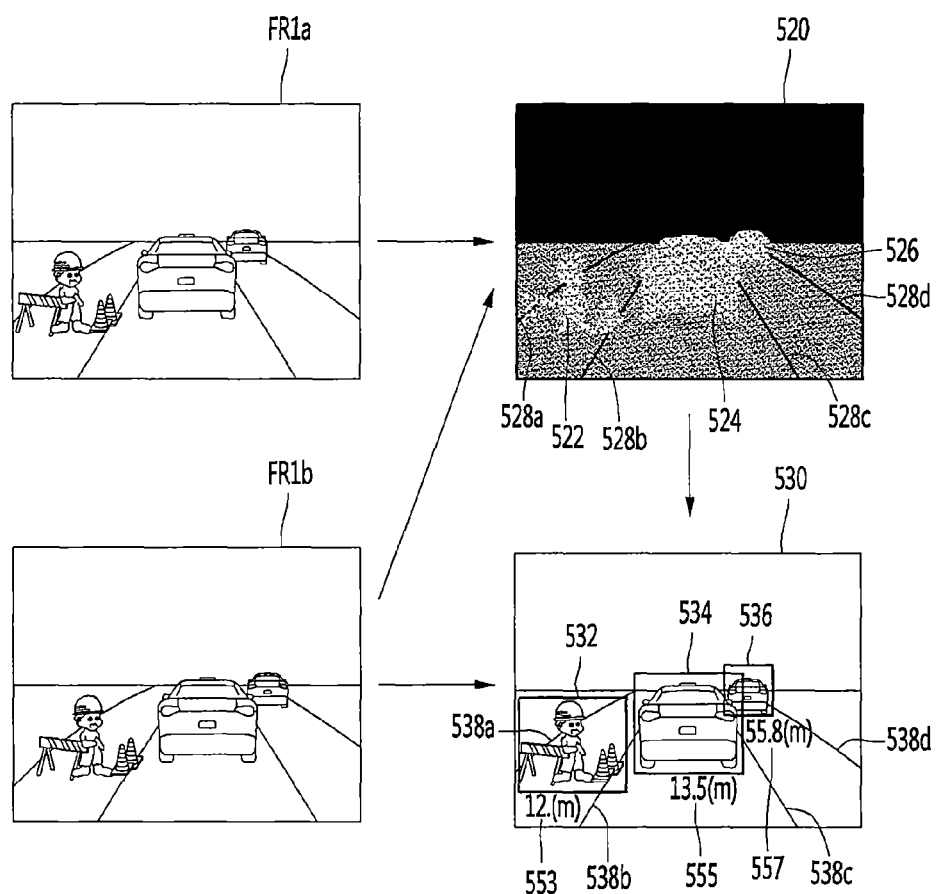

Referring to FIG. 7, the camera 160 can acquire a stereo image for a first frame section. The disparity calculator 420 in the processor 170 can receive stereo images FR1a and FR1b signal-processed by the image preprocessor 410, and perform stereo matching on the received stereo images FR1a and FR1b to acquire a disparity map 520.

The disparity map 520 represents parallax between the stereo images FR1a and FR1b according to level, and it is possible to calculate that the higher a disparity level is, the shorter a distance to a vehicle is, and the lower the disparity level is, the longer the distance to the vehicle is. When there is a need to display such a disparity map, the disparity map may also be displayed to have high luminance the higher the disparity level is and to have low luminance the lower the disparity level is.

FIG. 7 illustrates that in the disparity map 520, first to fourth lanes 528a to 528d respectively have corresponding disparity levels, and a construction area 522, a first front vehicle 524, and a second front vehicle 526 respectively have corresponding disparity levels. The segmentation unit 432, the object detector 434, and the object verification unit 436 perform segment, object detection, and object verification on at least one of the stereo images FR1a and FR1b based on the disparity map 520.

FIG. 7 illustrates how to detect and verify an object on the second stereo image FR1b by using the disparity map 520. That is, in an image 530, object detection and verification may be performed on first to fourth lanes 538a to 538d, a construction area 532, a first front vehicle 534, and a second front vehicle 536.

By the image processing, the driver assistance apparatus 100 can use the sensor unit 190 to detect what a surrounding object is, where the surrounding object is located or the like. Accordingly, the driver assistance apparatus 100 can detect whether there is a need to notify, a notification target, and what notification information is displayed to the notification target.

The driver assistance apparatus 100 can include an output unit that outputs, to the inside or outside of the vehicle 700, notification information on a notification situation. Also, when there is a need to notify the inside or outside of the vehicle, the driver assistance apparatus 100 can display an indicator through a display unit or output sound to notify a notification target inside or outside the vehicle.

Thus, the output unit 180 can include an indicator output unit 181, a display unit 183, and an audio output unit 185. Firstly, the indicator output unit 181 can display an indicator by light outside the vehicle. For example, the indicator output unit 181 can irradiate a laser to the road surface to project an image of an indicator onto the road surface to display the indicator.

The indicator output unit 181 can display an indicator on an area of at least one of sides around the vehicle. In the following, the indicator display method of the indicator output unit 181 is described in more detail with reference to FIGS. 8a to 8e. Specifically, the indicator output unit 181 can include a plurality of indicator output units, which is disposed at the vehicle 700 to irradiate lasers to different positions, and display indicators on all areas UA of the front, rear, left and right of the vehicle.

Figure 8A:
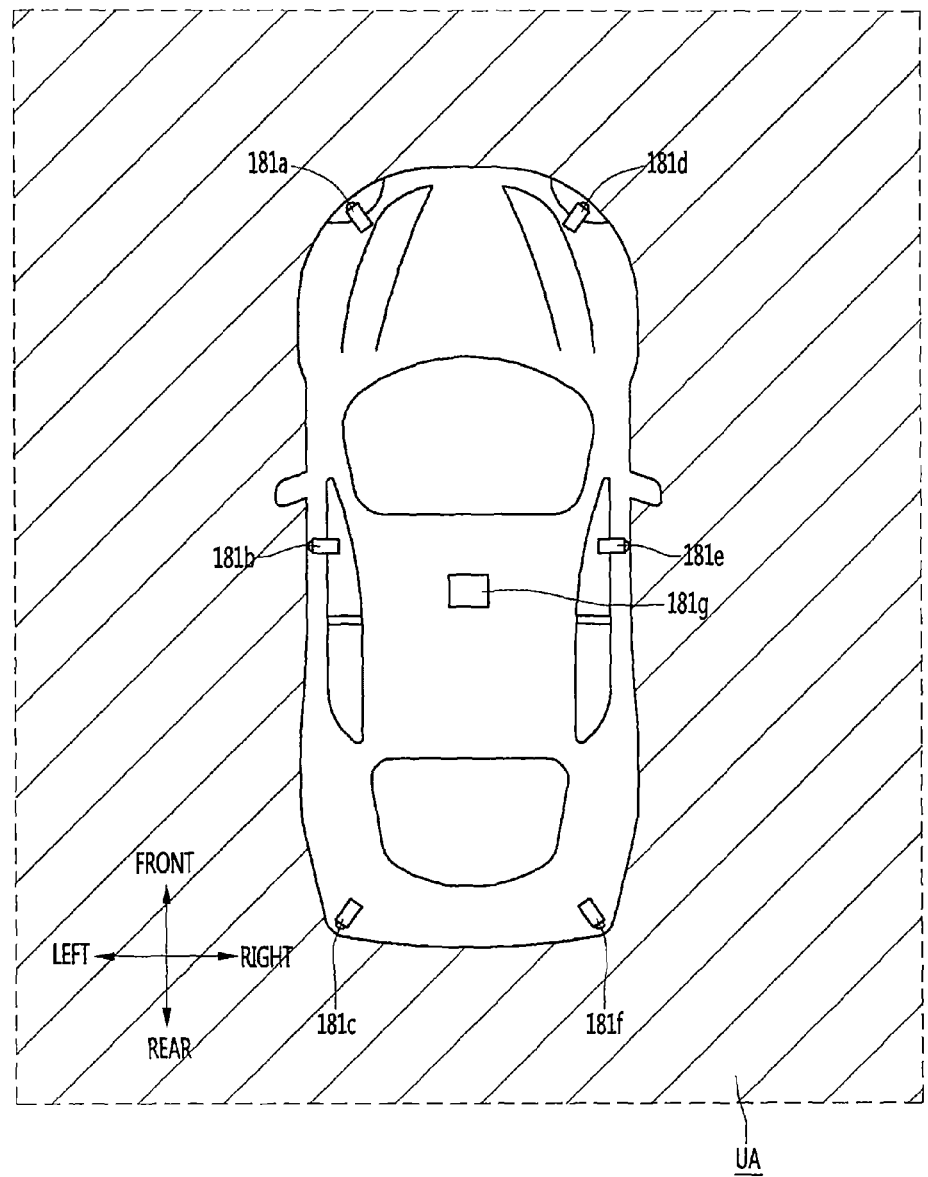
FIGS. 8a to 8e are diagrams illustrating an indicator output unit according to an embodiment.
Figure 8B:
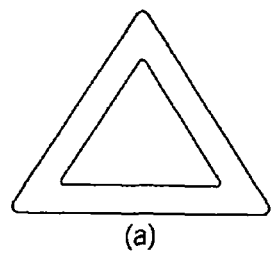
Figure 8B:
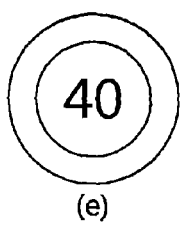
Figure 8B:
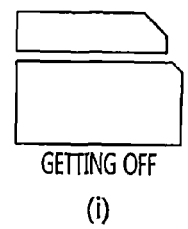
Figure 8B:
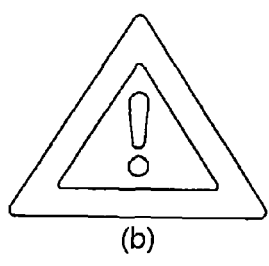
Figure 8B:
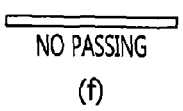
Figure 8B:
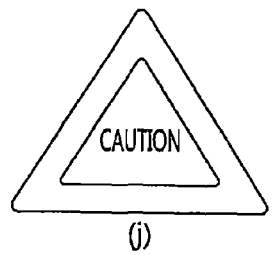
Figure 8B:
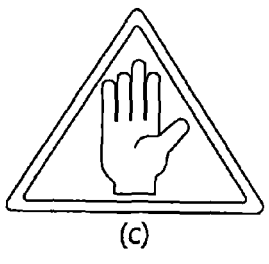
Figure 8B:
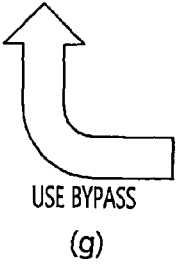
Figure 8B:
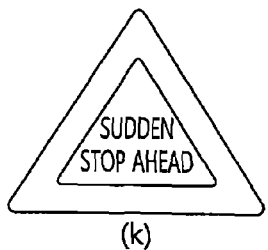
Figure 8B:
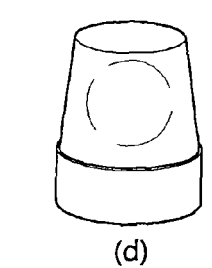
Figure 8B:
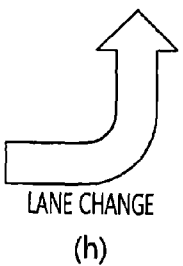
Figure 8B:
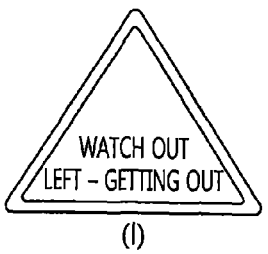

Referring to FIG. 8a, it is possible to dispose a first indicator output unit 181a near the left head lamp of the vehicle, a second indictor output unit 181b at the left body of the vehicle, and a third indicator output unit 181c near the left tail lamp to output indicators to the upper and lower areas of the left of the vehicle. Also, it is possible to dispose a fourth indicator output unit 181d near the right head lamp of the vehicle 700, a fifth indicator output unit 181e at the right body of the vehicle, and a sixth indicator output unit 181f near the right tail lamp to output indicators to the upper and lower areas of the right of the vehicle.

The indicator output units can irradiate lasers to their disposed positions to display indicators around the vehicle. Also, it is also possible to dispose a seventh indicator output unit 181g on the ceiling of the vehicle to display indicators on all areas of the front, rear, left and right of the vehicle.

The plurality of indicator output units 181 can display indicators on not only the front and rear of the vehicle but also the left and right of the vehicle to display indicators at proper positions according to the positional relationship with a notification target. For example, when a passenger gets out, it is possible to display an indicator representing getting out where the passenger gets out, to notify a getting-out situation to the outside to enable the passenger to safely get off.

That is, the plurality of indicator output units 181 can display indicators on a notification target's view area. Thus, if the positional relationship with the notification target varies, the indicator output unit 181 can display an indicator on a corresponding area to enhance indicator identification level. For example, the indicator output unit 181 can output an indicator on the left area of a vehicle to a notification target that moves from the rear left to the front, to display the indicator on the view area of the notification target, and display the indicator behind a vehicle or on the right area behind the vehicle if the notification target moves to the right.

The description of the above-described indicator output units is an example, and like another embodiment that includes only some of the indicators, it would be possible to dispose various indicator output units that can display indicators on the front, rear, left and right of a vehicle. In addition, the indicator output unit 181 can display indicators that include various images. That is, the indicator output unit 181 can display, outside the vehicle, indicators representing different images according to a situation to deliver accurate notification information to a notification target.

Further, the indicator output unit 181 can display an indicator that includes a sign image representing notification information. For example, referring to FIG. 8*b*, various sign images (a) to (d) that represent caution may be included in indicators so that a notification target may intuitively perceive a dangerous situation.

The indicator output unit 181 can display a text image summarizing a notification situation in the indicator. For example, referring to FIG. 8*b*, an indicator (e) including a sign image that represents a recommended speed, an indicator (f) including a small caution sign image and a text image, indicators (g) and (h) including sign images and text images that represent recommended routes, an indicator (i) including a sign image and a text image that alert a getting-out situation, indicators (j) to (l) including sign images that represent caution and text images that represent caution situations are included in the indicators, thus a notification target may accurately perceive even what the caution situation is.

That is, the indicator output unit 181 can display, outside the vehicle, indicators having images suitable for each situation to effectively deliver notification information to a notification target. The indicator output unit 181 can simultaneously output a plurality of indicators.

Specifically, the indicator output unit 181 can also display indicators on different areas around a vehicle. For example, when the notification target is in plurality, it is possible to display an indicator on each target, in which case it is also possible to display different indicators according to the situation of a notification target.

Figure 8C:
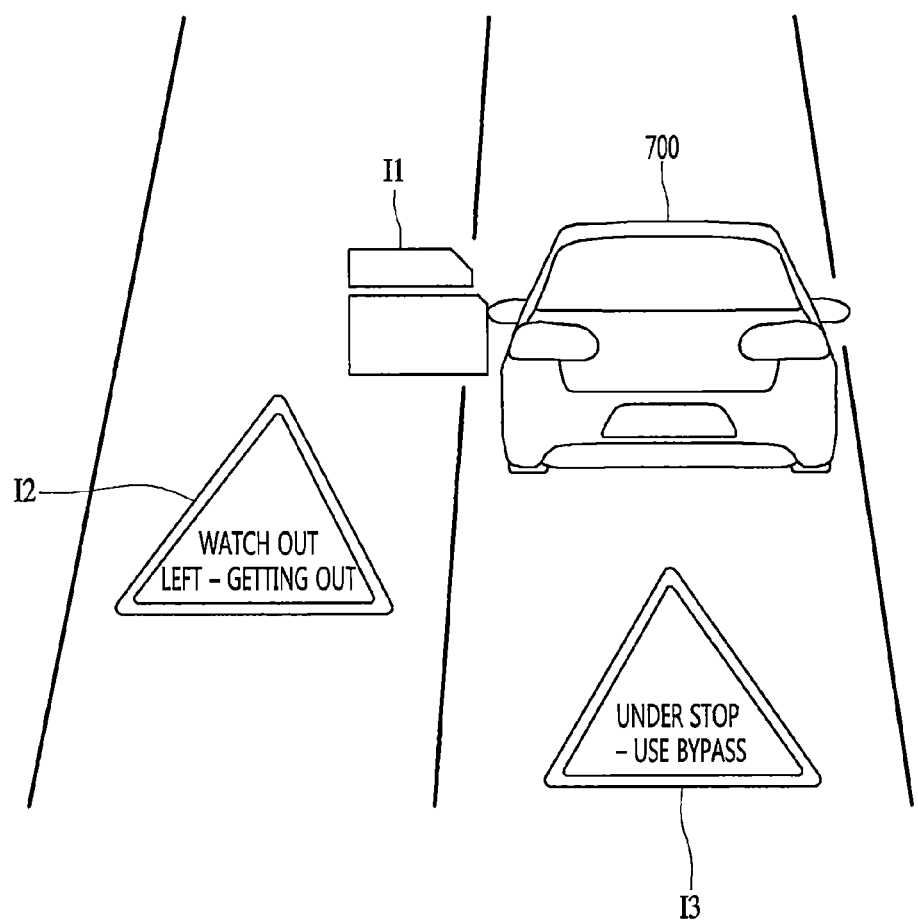

For example, referring to FIG. 8*c*, when a driver gets out the vehicle is detected and a corresponding indicator is output, the indicator output unit 181 can simultaneously display a first indicator I1 representing getting out on the left of a driver side door, display a second indicator I2 behind the first indicator I1 to alert a first notification target that approaches the left rear, and display a third indicator I3 behind the vehicle to alert a second notification target that approaches the rear.

That is, the indicator output unit 181 can simultaneously display different indicators on many areas to display different pieces of notification information on each position. The indicator output unit 181 can also display the same indicator in various sizes. For example, the indicator output unit 181 can display a large indicator when a notification target is in a long distance, and a small indicator when the notification target is in a short distance, thus it is possible to enhance identification level.

In this instance, a single indicator output unit 181 can also display the indicator in various sizes. Alternatively, a plurality of indicator output units 181 can simultaneously display a single indicator so that it is possible to display a large indicator. When the plurality of indicator output units 181 are used to display the large indicator, it is possible to display each indicator with high output power and thus there is an advantage in that the brightness of the indicator increases and identification level is enhanced.

Figure 8D:
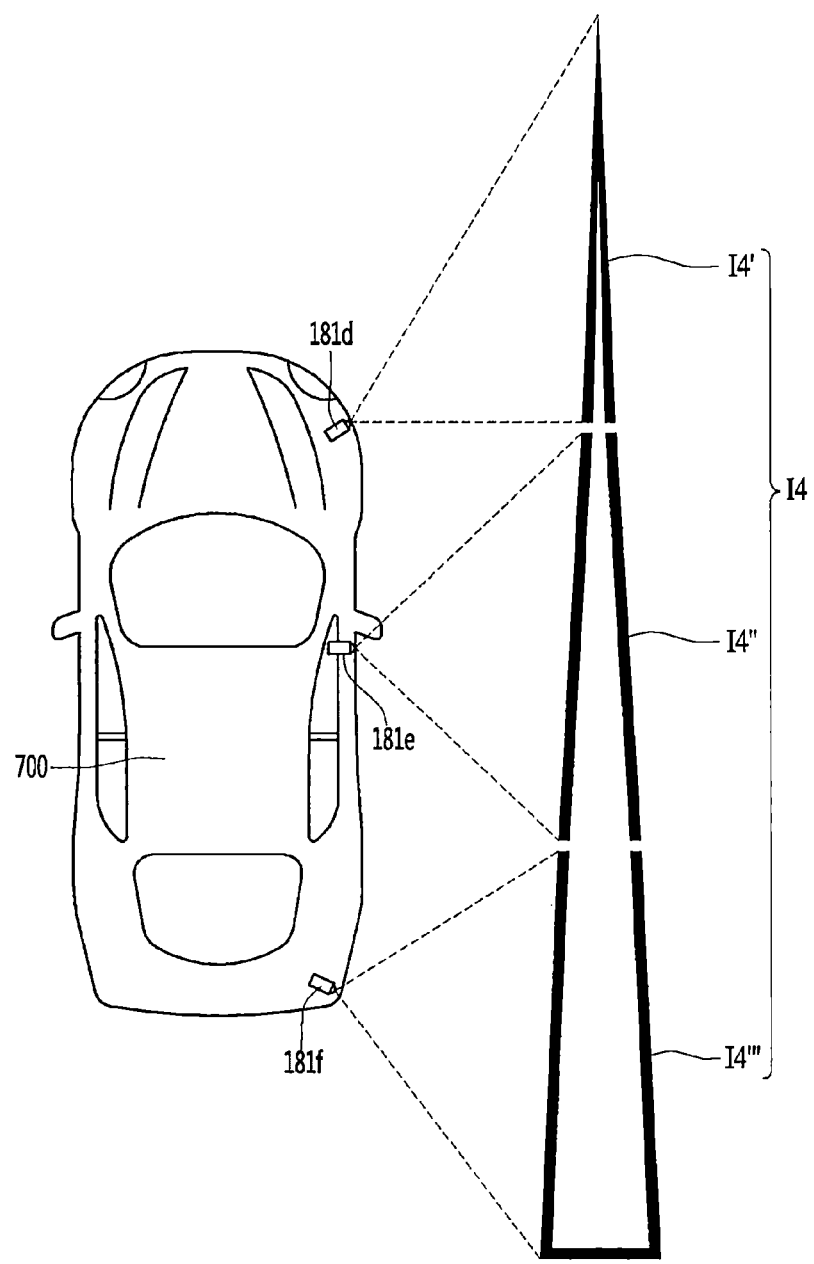
Figure 8E:
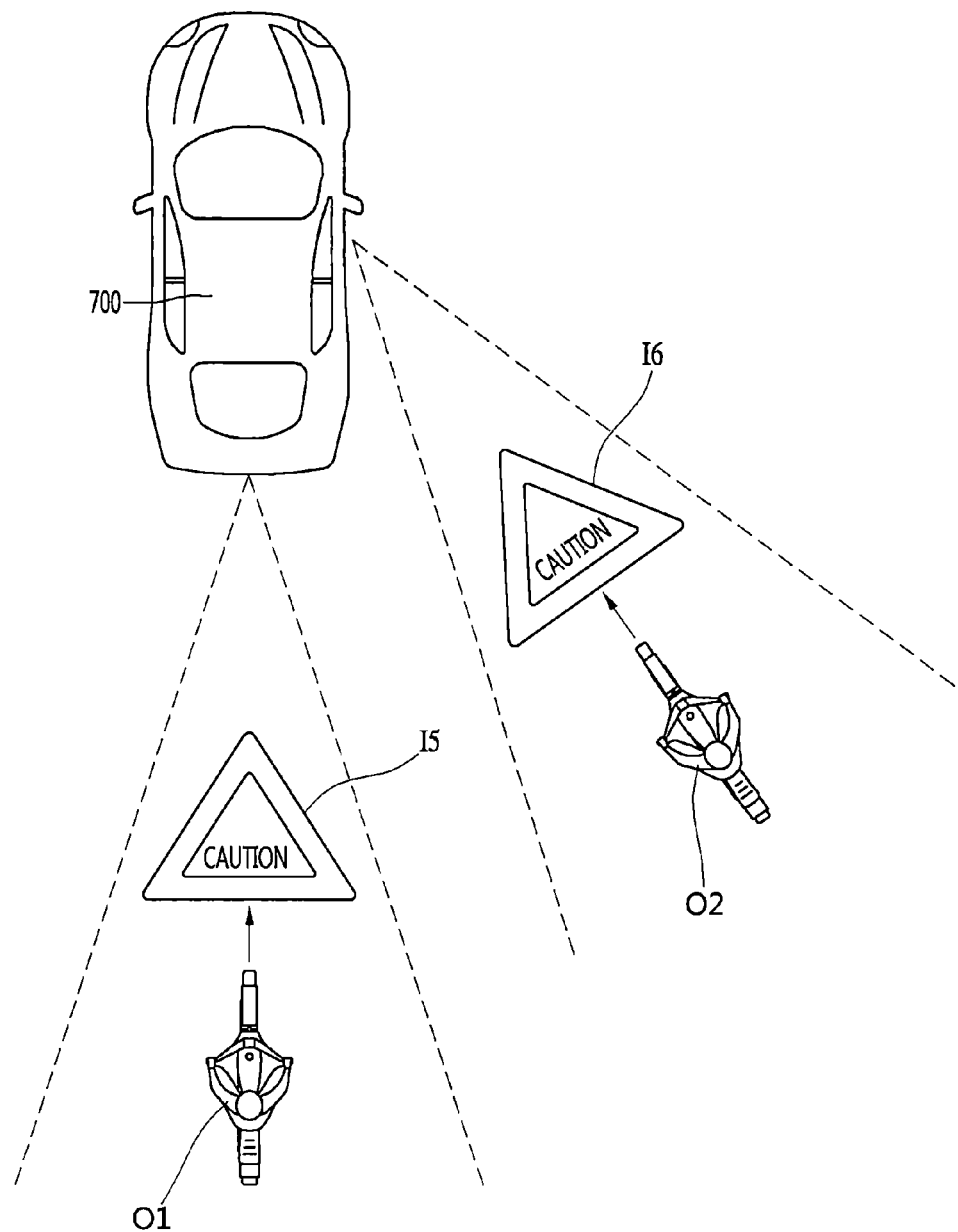

For example, referring to FIG. 8*d*, a fourth indicator output unit 181*d* can display a first partial indicator I4' on the upper right of a vehicle, a fifth indicator output unit 181*e* can display a second partial indicator I4" on the right of the vehicle, and a sixth indicator output unit 181*f* can display a third partial indicator I4'" on the lower right of the vehicle. In addition, the first to third partial indicators I4' to I4'" may express a fourth indicator I4 as a whole to output a large indicator I4.

On the contrary, when a small indicator is displayed, it is possible to operate only some of the fourth to sixth indicator output units 181*d* to 181*f* to display the small indicator. Thus, when a notification target approaching from a distance is detected, the indicator output unit 181 can gradually decrease the size of an indicator with a decrease in distance so that it is possible to output an indicator of a size suitable for the view area of the notification target.

The indicator output unit 181 can display an indicator in the direction of arrangement of a notification target. In this instance, the indicator output unit 181 can correct a phase in consideration of the view of the notification target and then display a corrected indictor. Specifically, referring to FIG. 8*e*, it is possible to display a fifth indicator I5 at the rear for a first notification target O1 that is located at the rear, and it is possible to together display a sixth indicator I6 at the right rear for a second notification target O2 that is located at the right rear.

In addition, the fifth and sixth indicators I5 and I6 may be displayed with different phases. For example, it is detected that the first notification target O1 moves forward and thus the view area of the first notification target O1 is the front of the first notification target O1, thus it is possible to display so that the phase of the fifth indicator I5 is the front direction.

Also, it is detected that the second notification target O2 moves to the left front and thus the view area of the second notification target O2 is the left front, thus it is possible to display so that the phase of the sixth indicator I6 is the left front direction. That is, the indicator output unit 181 can consider the direction of movement of the notification target as a phase direction to display the indicator. In addition, if the direction in which the notification target varies, it is also possible to change the phase of the indicator to indicator a changed indicator.

The output unit 190 may output, to the inside of a vehicle, information on the indicator, configuration information, or the like that is displayed outside, and also notify the inside of notification information. Thus, the output unit 190 can include the display unit 183 and the audio output unit 185.

Figure 9:
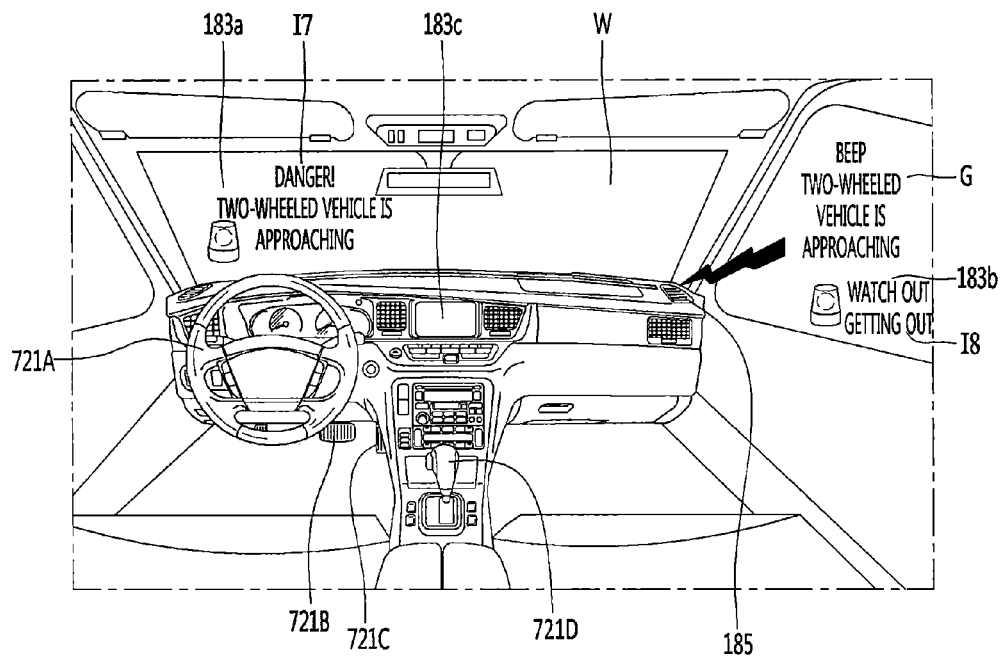
FIG. 9 is a diagram illustrating a display unit according to an embodiment.

Firstly, the display unit 183 may display an indicator representing a notification situation, on the inside of a vehicle. Such a display unit 183 can include a plurality of display units. Referring to FIG. 9, such a display unit 183 can include a first display unit 183*a* that projects and displays a seventh indicator I7 onto the windshield W of the vehicle 700.

That is, the first display unit 183*a* can be a head up display (HUD) and include a projection module projecting an image onto the windshield W. In addition, since a projected image projected by the projection module has a predetermined transparency, a user can simultaneously see the projected image and a view after the projected image.

The projected image displayed on such a first display unit 183*a* can overlap a reflected image reflected to the window shield W to implement augmented reality (AR). The display unit 183 can include at least one second display 183*b* that displays an eighth indicator I8 on side glass G.

When the driver seat occupies a reference position, the second display 183*b* may display an image on left side glass, an image on right side glass, an image on rear left side glass, and an image on rear right side glass. That is, the second display 183*b* may display an indicator at the position of a passenger. Such a second display 183*b* may display the approaching of an external moving object with an indicator at a passenger side who gets out.

The display unit 183 can include a third display unit 183*c* that is separately installed in the vehicle 700 and displays an image. Specifically, the third display unit 183*c* may be the display of a vehicle navigation apparatus or the front cluster inside the vehicle.

The third display unit 183*c* can include at least one of a liquid crystal display (LCD), a thin film transistor-liquid crystal display (TFT LCD), an organic light-emitting diode (OLED), a flexible display, a 3D display, and an e-ink display. Such a third display unit 183*c* may be integrated with a touch input unit to form a touch screen.

The driver assistance apparatus 100 can further include the audio output unit 185 and a power supply unit 145. Specifically, the audio output unit 185 can output a description on the function of the driver assistance apparatus 100, a message checking whether to execute the function, or notification information through sound. That is, the driver assistance apparatus 100 can supplement a description on the function of the driver assistance apparatus 100 through the sound output of the audio output unit 185, in addition to a visual display through the display unit 183.

For example, referring to FIG. 9, the audio output unit 185 can output a beep along with the indicator I8 representing "Watch out getting out" information in a getting-out situation to enhance the delivery of notification information. The power supply unit 145 can also receive external power or internal power by the control of the processor 170 to supply power needed for the operation of each component.

In addition, the driver assistance apparatus 100 can include the processor 170 that controls the overall operations of each unit in the driver assistance apparatus 100. The processor 170 can control at least some of the components discussed with reference to FIG. 3, in order to execute an application program. Furthermore, the processor 170 can combine and operate at least two of the components in the driver assistance apparatus 100 in order to execute the application program.

The processor 170 can be implemented by using at least one of an application specific integrated circuit (ASIC), a digital signal processor (DSP), a digital signal processing device (DSPD), a programmable logic device (PLD), a field programmable gate array (FPGA), a controller, a microcontroller, a microprocessor 170, and electrical units for executing other functions.

In addition, such a processor 170 can be controlled by a control unit or control various functions of the vehicle 700 through the control unit. In addition, the processor 170 typically controls the overall operations of the driver assistance apparatus 100 in addition to operations related to the application program stored in the memory 140. The processor 170 can process a signal, data, information, or the like input or output through the above-described components or execute the application program stored in the memory to provide appropriate information or function to a user or process related information or function.

Figure 10:
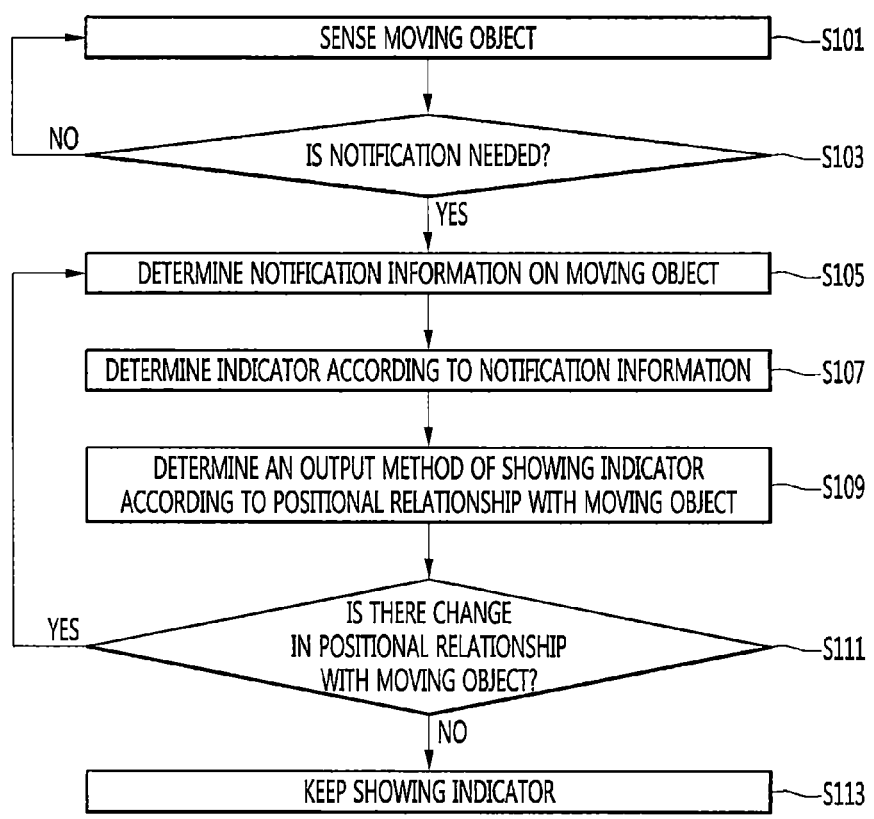
FIG. 10 is a flowchart of an indicator display method according to an embodiment.

In the following, how a processor controls each unit to display an indicator is described in more detail with reference to FIG. 10. Firstly, the processor 170 can detect an object through the sensor unit 190 in step S101. For example, the processor 170 can perform image processing on the image acquired by the camera 160 to detect the attribute of an object in an image. Also, it is possible to detect the positional relationship with the object through the distance sensor 191.

The processor 170 can further acquire, from each unit, information, such as communication information, sensor information, monitoring information, navigation information or the like. Next, the processor 170 can determine whether the detected object is a notification target in step S103. Specifically, the processor 170 can determine whether the object detected from the acquired information is a notification target.

For example, when the object detected from image information is another vehicle, a pedestrian or a two-wheeled vehicle, the processor 170 can set it as a notification target. In addition, the processor 170 can detect a notification situation. For example, for a getting-out situation, a moving-backward situation, a stop situation, an interchange entrance situation, a collision risk detection situation, and an indicator display request are detected from the above-described information, the processor 170 can determine to be a notification situation.

The processor 170 can determine that there is a need to notify when a notification target and a notification situation are detected. However, the embodiment is not limited thereto and it is also possible to unconditionally display an indicator when only the notification situation is detected.

If the notification situation is detected (Yes in S103), the processor 170 can determine notification information in step S105. Here, the notification information means details that are needed to deliver the notification situation to the notification target. In addition, the processor 170 can determine an indicator according to notification information in step S107.

Specifically, the processor 170 can search an indicator matching the notification situation from the memory 140 or the external server 500 to determine an indicator to be displayed. For example, when the notification information is information on a situation in which a passenger gets out, the processor 170 can extract an indicator that includes an image representing getting out, a direction in which a passenger gets out, or caution. Specifically, the indicator may be an indicator that includes a sign image representing a door shape and a text image "getting out".

Such an indicator can include a sign image representing a notification situation by sign and/or text briefly representing notification information. In addition, the processor 170 can determine an indicator display method according to the positional relationship of a notification target and control an indicator output unit so that an indicator is displayed according to the determined method, in step S109.

Specifically, the processor 170 can determine at least one of an indicator display position, a size, brightness, saturation, color, and a phase and an indicator image according to the positional relationship with a notification target to enhance indicator identification level. For example, the processor 170 can determine the position of a display area to be a position corresponding to the direction of arrangement of a notification target is located and a direction in which the notification target moves.

The processor 170 can determine the size of a display area according to a distance to the notification target. The processor 170 can determine the phase of an indicator according to the direction in which the notification target moves, and enable the indicator to be displayed according to the determined display position, display area, size and phase.

Next, the processor 170 can detect a variation in position relationship with a notification situation in step S111. For example, the processor 170 can detect a variation in at least one of the direction of arrangement, a distance, or the direction of movement due to the movement of a notification target or the present vehicle 700 and detect a corresponding variation.

When the positional relationship with a notification target varies (Yes in S111), the processor 170 can control an indicator output unit so that an indicator display method varies accordingly. Specifically, when the direction of arrangement of a notification target varies, the processor 170 can accordingly change and display the position of an indicator display area.

For example, the processor 170 can gradually change a display area from the left to the right with a gradual movement of a notification target from the left to the right to enable an indicator to continue to be displayed on the view area of the notification target. Also, when the distance to a notification target varies, the processor 170 can change and display at least one of the size, brightness, or saturation of an indicator.

For example, when a notification target gradually approaches, the processor 170 can decrease an indicator size gradually or step by step to enable an indicator to continue to correspond to the view area of the notification target. Also, when the notification target gradually approaches, the processor 170 can gradually increase the saturation of an indicator to enable the notification target to intuitively perceive the meaning of warning.

In addition, when a notification target gradually approaches, the processor 170 can change an image of an indicator. Specifically, when it is difficult to display a sign image because the distance between an indicator and a vehicle is short and thus a display area decreases, an image of an indicator corresponding to the decreased area may be displayed. Also, when a notification situation varies according to a variation in distance between an indicator and a vehicle, an image of an indicator suitable for the changed notification situation may be displayed.

Figure 11:
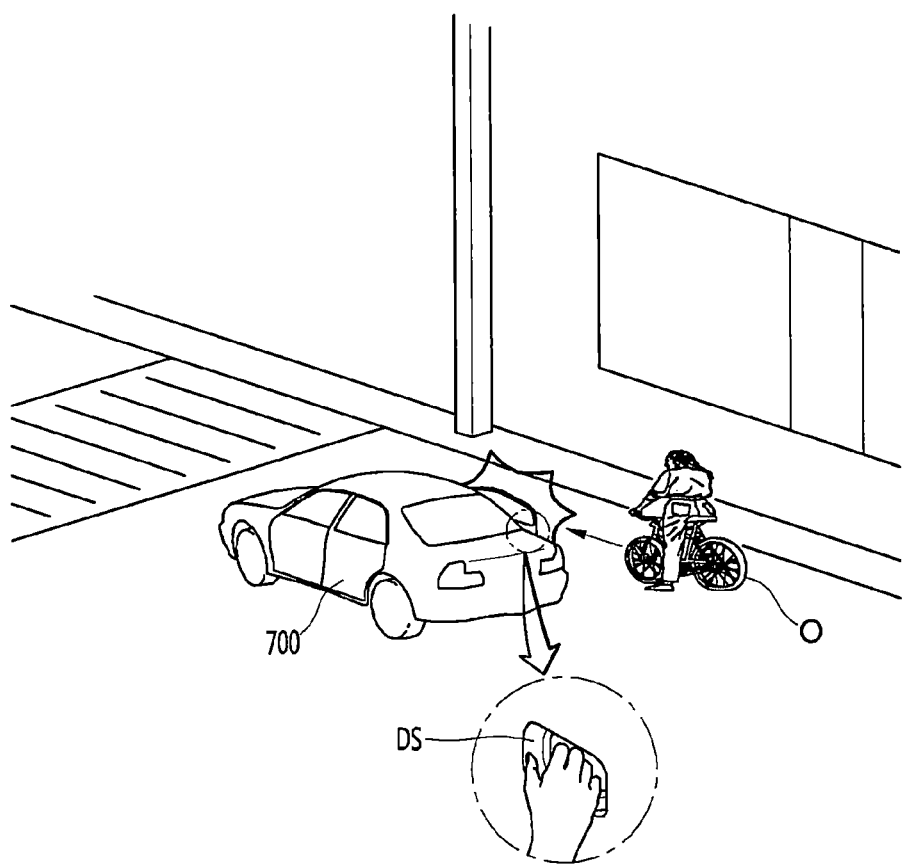
FIG. 11 represents an example of a notification situation according to an embodiment.

In the following, how the driver assistance apparatus 100 displays an indicator is described in detail through particular embodiments with reference to FIGS. 11 to 14*b*. Referring to FIG. 11, if a two-wheeled vehicle O moves behind a vehicle but a passenger does not perceive it and opens the door to get out of the vehicle, there is a possibility that the door of the vehicle 700 collides with the two-wheeled vehicle O.

Also, when there is another vehicle behind the vehicle 700, there is a limitation in that it is difficult to smoothly drive because it is difficult to predict when the vehicle starts. When the getting out situation is detected, the driver assistance apparatus 100 can output an appropriate indicator to prevent an accident and lead to a smooth driving condition.

Specifically, referring to FIG. 11, the driver assistance apparatus 100 can detect a getting out situation. For example, when the operation of getting out is detected from the image acquired from the monitoring unit 150, the driver assistance apparatus 100 can detect a getting out situation. The driver assistance apparatus 100 can also detect through the door sensor DS that a door knob is in contact with the hand of a passenger, through which it may detect a getting out situation.

The driver assistance apparatus 100 can also detect that the vehicle has arrived at the destination and has stopped, through which it can detect a getting out situation. In addition, the driver assistance apparatus 100 can determine a display area so that it corresponds to the view area of a notification target, according to the positional relationship between the notification target and the present vehicle 700.

Figure 12A:
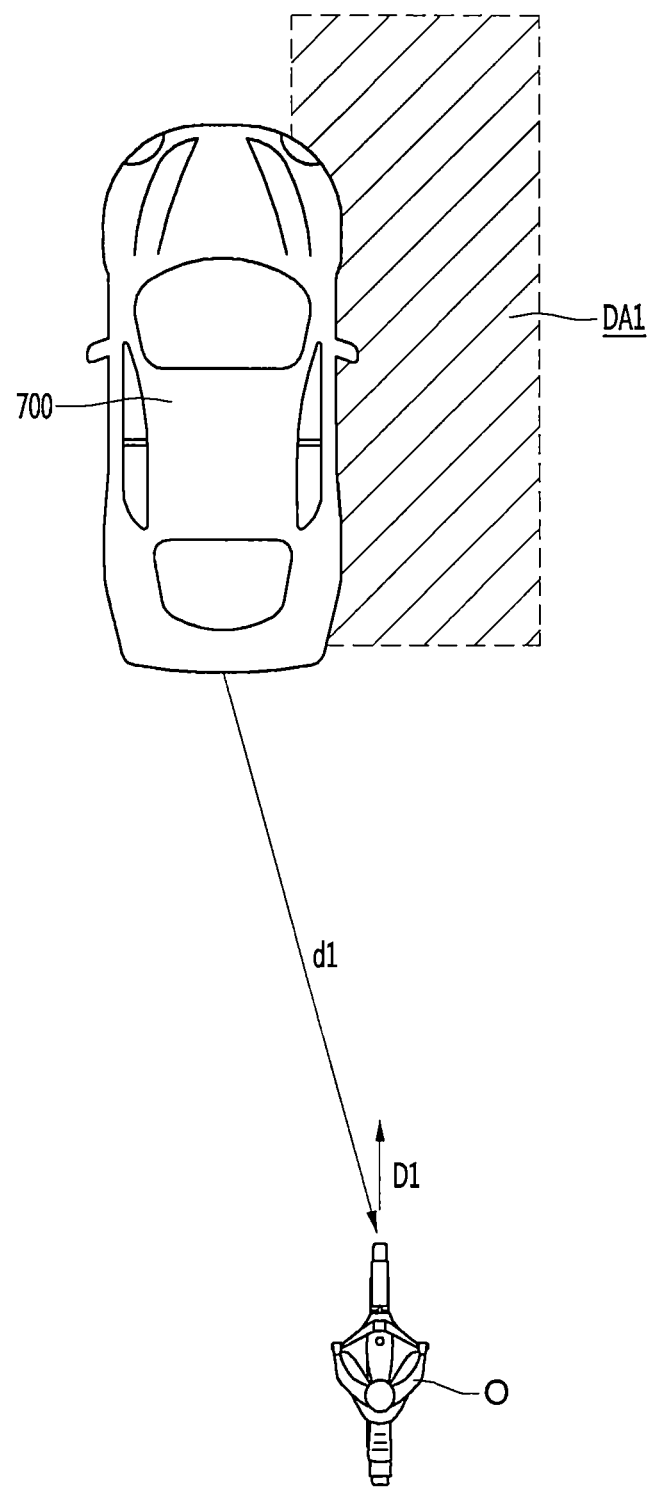
FIGS. 12a to 12g represent methods of displaying indicators in various situations according to embodiments.
Figure 12B:
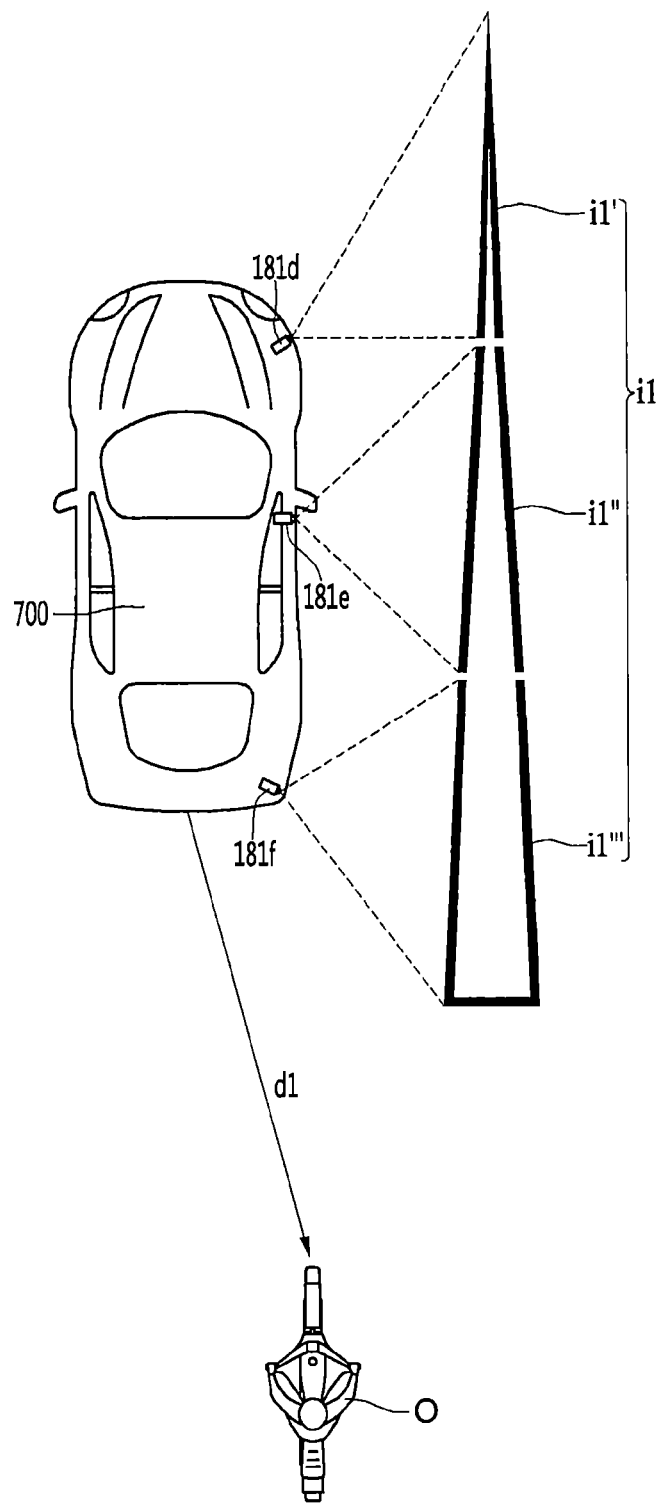
Figure 12C:
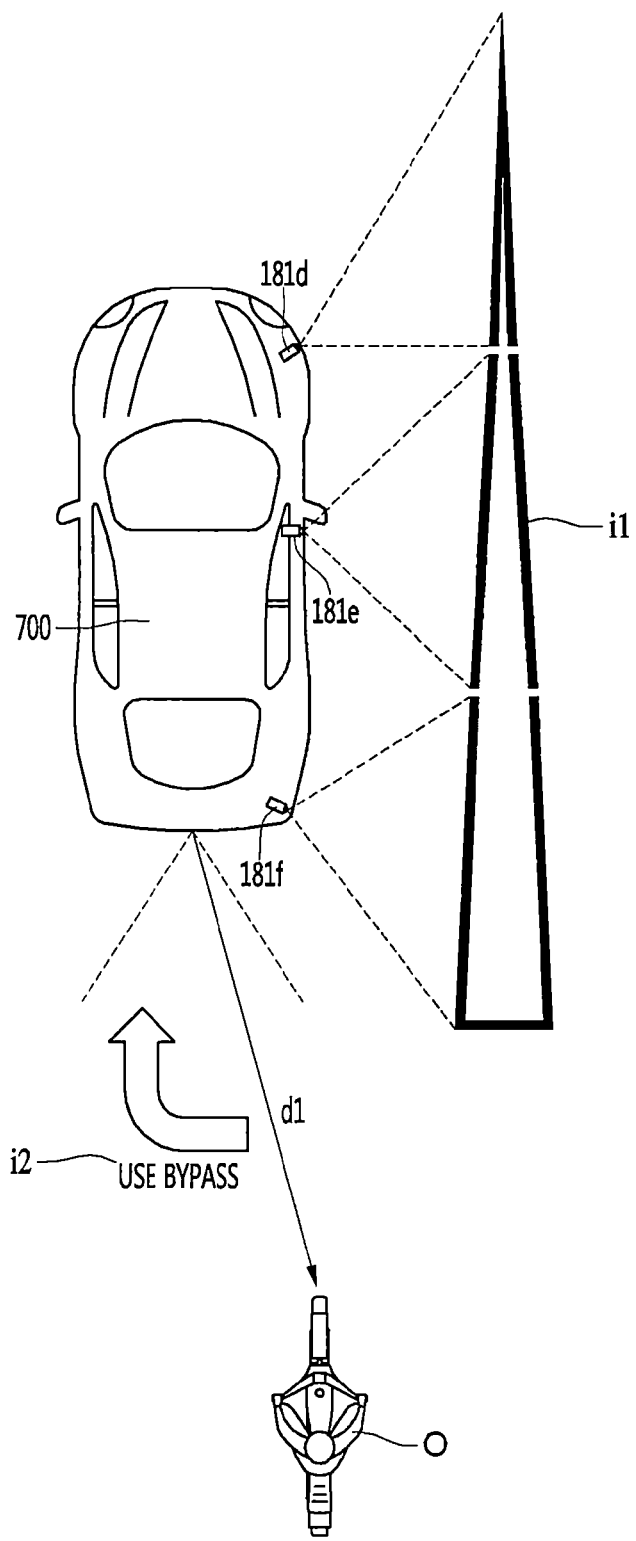

Specifically, referring to FIG. 12*a*, the positional relationship d1 with a notification target O can include a distance, the direction of arrangement, and the direction of movement D1 of the notification target O. In addition, an indicator display area DA1 may be determined to correspond to the positional relationship d1 of the notification target O.

Specifically, since the view area of the notification target O that moves forward with a first distance d1 at the right rear is the right area of the vehicle, the right area of the vehicle can be determined to be the indicator display area DA1. In addition, the display area may vary according to a change in positional relationship d1 with the notification target O. For example, when the notification target O moves from the rear left of the vehicle to the right, the indicator display area DA1 may also move from the left area to the right area through the rear area according to the movement.

The driver assistance apparatus 100 can determine the size of an indicator according to the distance to the notification target and enable the size of the indicator to be changed according to a variation in distance. For example, referring to FIG. 12*b*, the driver assistance apparatus 100 can determine the size of the indicator size according to the first distance d1 when the distance between the vehicle and the notification target O is the first distance d1. In order to enable the notification target O to identify an indicator from the first distance d1, the driver assistance apparatus 100 can control fourth to sixth indictor output units 181*d* to 181*f* so that it is possible to display a first indicator i1 of a first size.

Figure 12D:
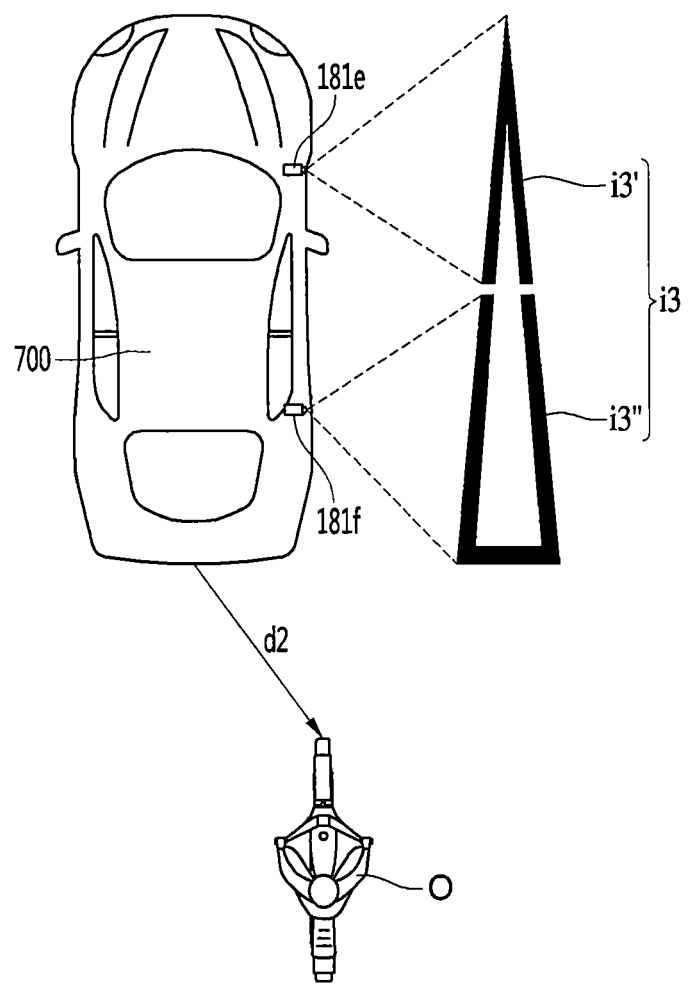

Referring to FIG. 12*d*, if the distance between the vehicle and the notification target O is short and thus changes to a second distance d2 shorter than the first distance d1, the driver assistance apparatus 100 can determine the size of an indicator according to the second distance d2. That is, the size of the indicator may decrease so that the notification target O close to the vehicle may identify the whole indicator. For example, the driver assistance apparatus 100 can control fifth and sixth indictor output units 181*e* and 181*f* so that it is possible to display a third indicator i3 of a second size smaller than the first size.

Figure 12E:
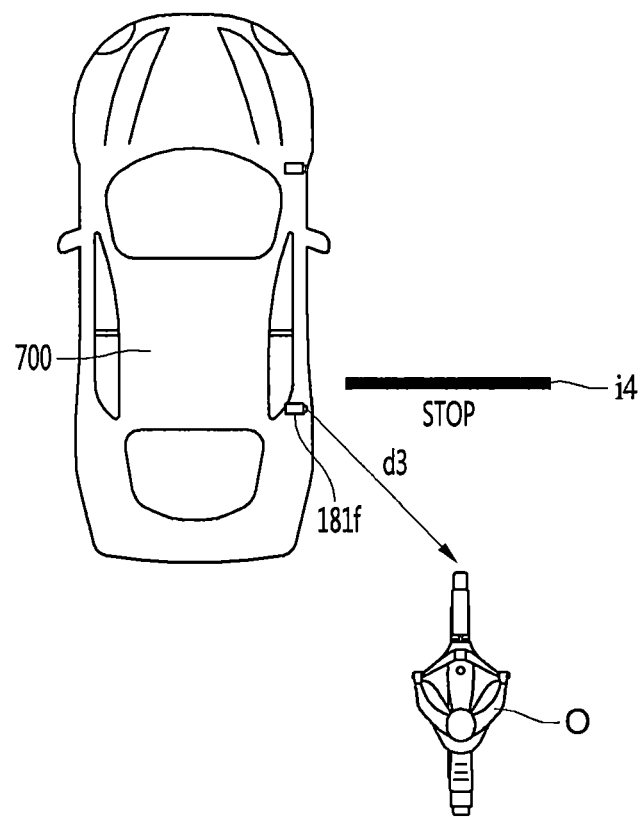
Figure 12F:
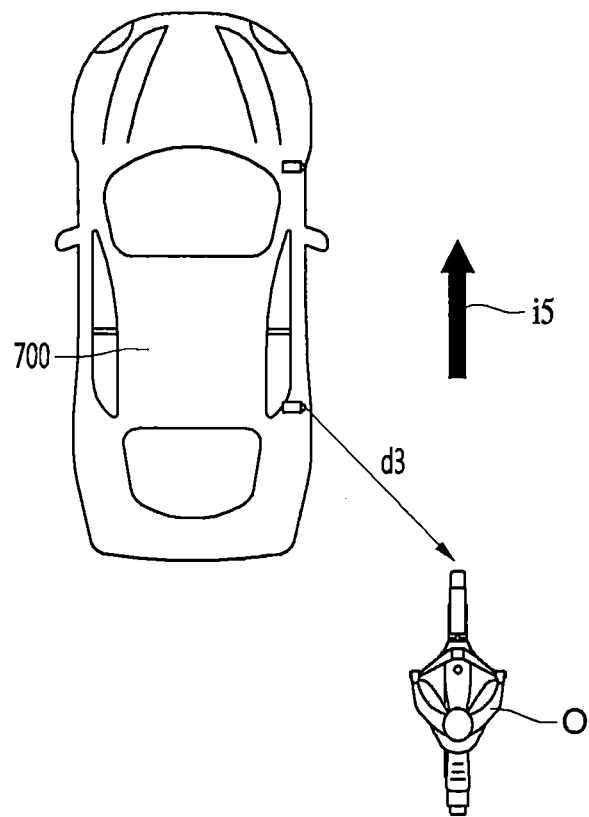

Referring to FIG. 12*e*, if the distance between the vehicle and the notification target O is shorter and thus changes to a third distance d3 shorter than the second distance d2, the driver assistance apparatus 100 can determine the size of an indicator according to the third distance d3. That is, since the notification target O is close to the vehicle, the size of the indicator may decrease so that the notification target O identifies the whole indicator.

For example, the driver assistance apparatus 100 can control the sixth indictor output unit 181*f* so that it is possible to display a fourth indicator i4 of a third size smaller than the second size. In this instance, it may be difficult to display existing first to third indicators i1 to i3 with a decrease in size of indicator. In consideration of this, the driver assistance apparatus 100 can change and display to the fourth indicator i4 that may display an indicator in size smaller than or equal to a certain size.

The driver assistance apparatus 100 can detect different pieces of notification information according to a change in distance to change an indicator to be suitable for the notification information. For example, referring to FIG. 12*f*, the driver assistance apparatus 100 can display a fifth indicator i5 that represents a recommended route so that the notification target O quickly passes the vehicle by, if it is detected that the distance between the notification target O and the vehicle is the third distance d3 and a passenger has stopped getting out. In this instance, the driver assistance apparatus 100 can change and display the fifth indicator i5 to green and display the fourth indicator i4 with another color, red so that it assists the notification target O in intuitively recognizing a notification information change.

The driver assistance apparatus 100 can display a plurality of indicators for a single notification target O to display more pieces of notification information. For example, referring to FIG. 12c, the driver assistance apparatus 100 can display a first indicator representing "watch out getting out" on the left area of the vehicle, and a second indicator i2 representing a bypass route on the rear area of the vehicle so that the notification target O smoothly travels through the bypass route.

In addition, the driver assistance apparatus 100 can change a display area according to a variation in the direction of arrangement or the direction of movement of the notification target. In this instance, since the positional relationship with the notification target varies, the driver assistance apparatus 100 can also change an indicator image if it is determined that a notification situation has varied.

Figure 12G:
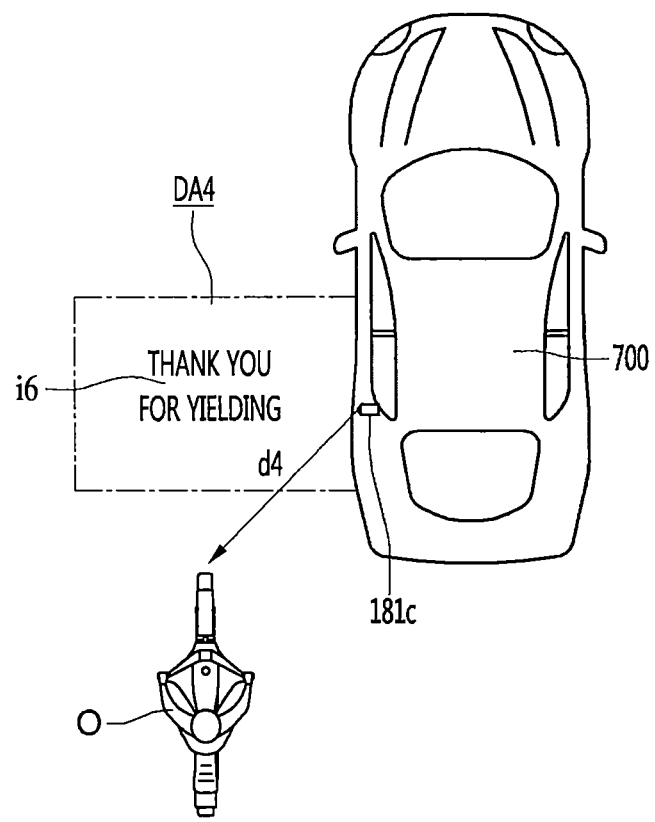
Figure 13:
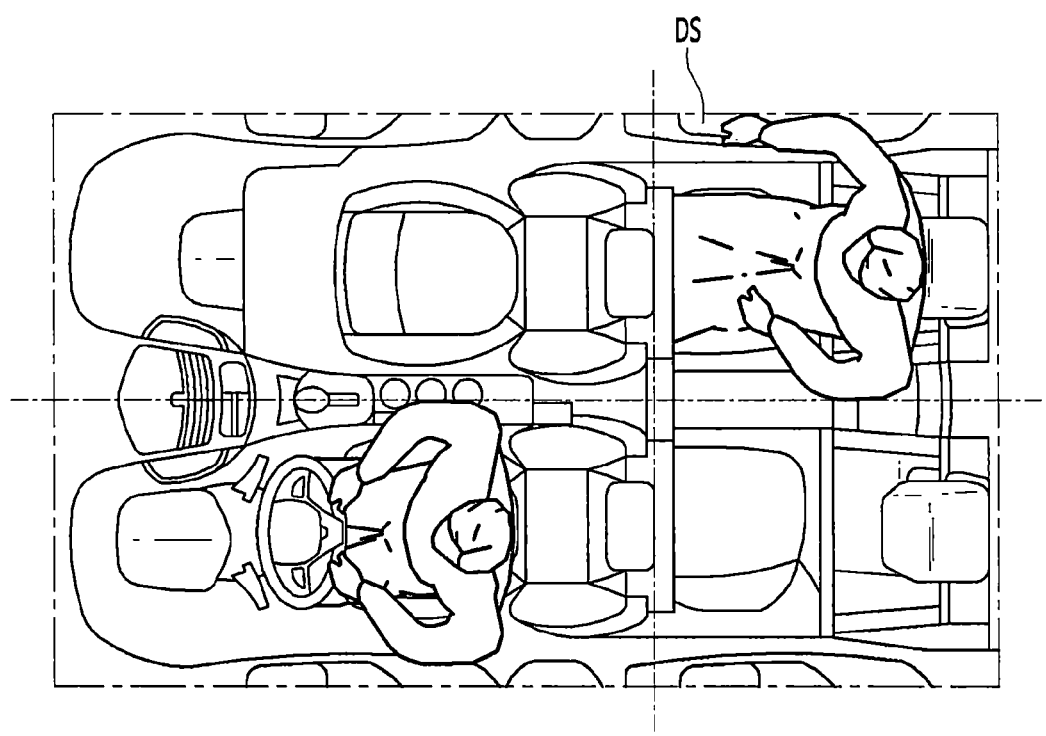
FIG. 13 represents a situation inside a vehicle in FIG. 11.

Specifically, referring to FIG. 12g, the driver assistance apparatus 100 can determine the right area of the vehicle to be a fourth display area DA4 because the notification target O moves to the right rear of the vehicle. In addition, the driver assistance apparatus 100 can determine the movement of the notification target O to the right rear to be yielding, change and display to a sixth indicator i6 that represents thanks.

The driver assistance apparatus 100 can also output notification information to the inside of the vehicle to deliver notification information to a passenger. Specifically, referring to FIG. 13, the monitoring unit 150 may detect that there is a passenger at the right rear of a driver and the passenger attempts to get off. In addition, since the notification target O is approaching the right rear of the vehicle, it is desirable to output notification information to the passenger.

Thus, the driver assistance apparatus 100 can output the notification information to the inside of the vehicle through a display unit and the audio output unit 190. Specifically, referring to FIG. 14a, the driver assistance apparatus 100 can display, on the first display unit 181a, a seventh indicator i7 representing that there is a moving object approaching from the right rear.

Figure 14A:
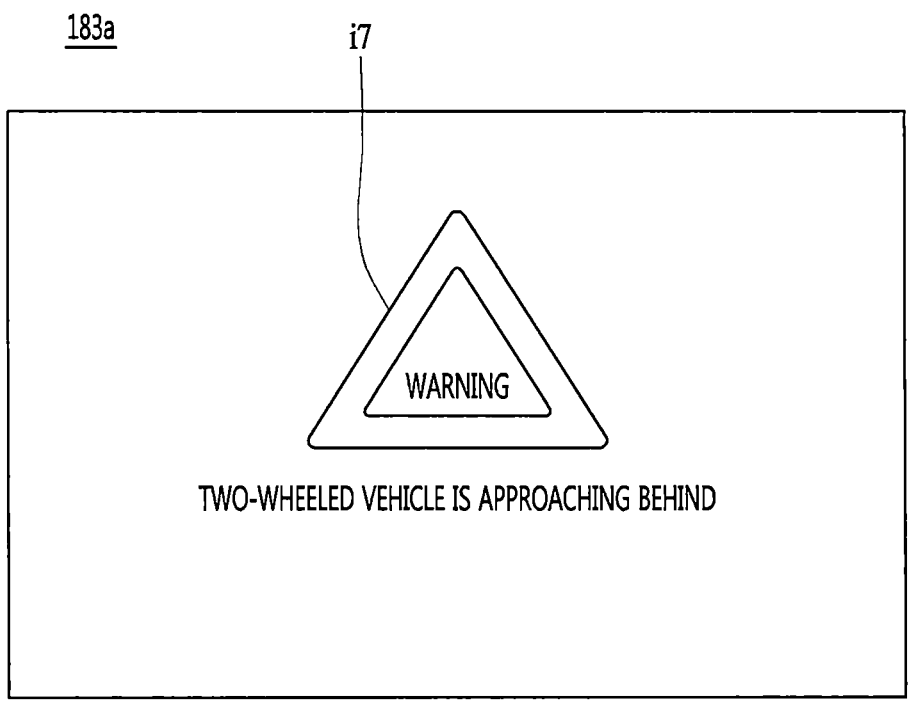
FIGS. 14a and 14b represent methods of outputting a notification inside a vehicle according to an embodiment.
Figure 14B:
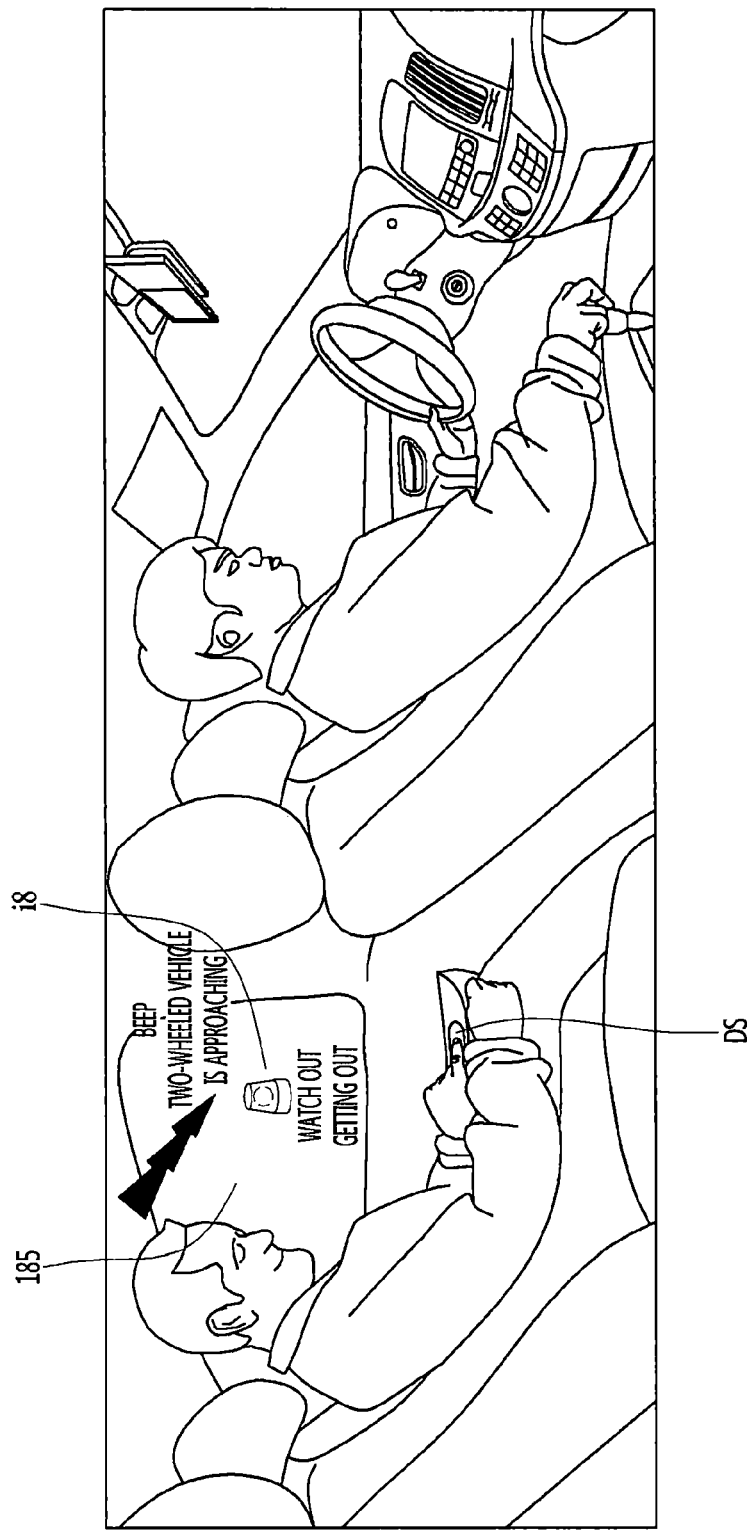

Also, referring to FIG. 14b, the driver assistance apparatus 100 can display, on the right rear side glass of the vehicle, an eighth indicator i8 representing that there is a moving object approaching from the rear, and output a beep and an audio message through the audio output unit 185.

In summary, the drive assistance apparatus 100 can display an indicator to represent appropriate notification information inside and outside the vehicle according to the positional relationship with a notification target in a getting out situation, decrease a collision risk with the notification target to assist in safely getting out, and assist in smooth travel of the notification target.

Figure 15:
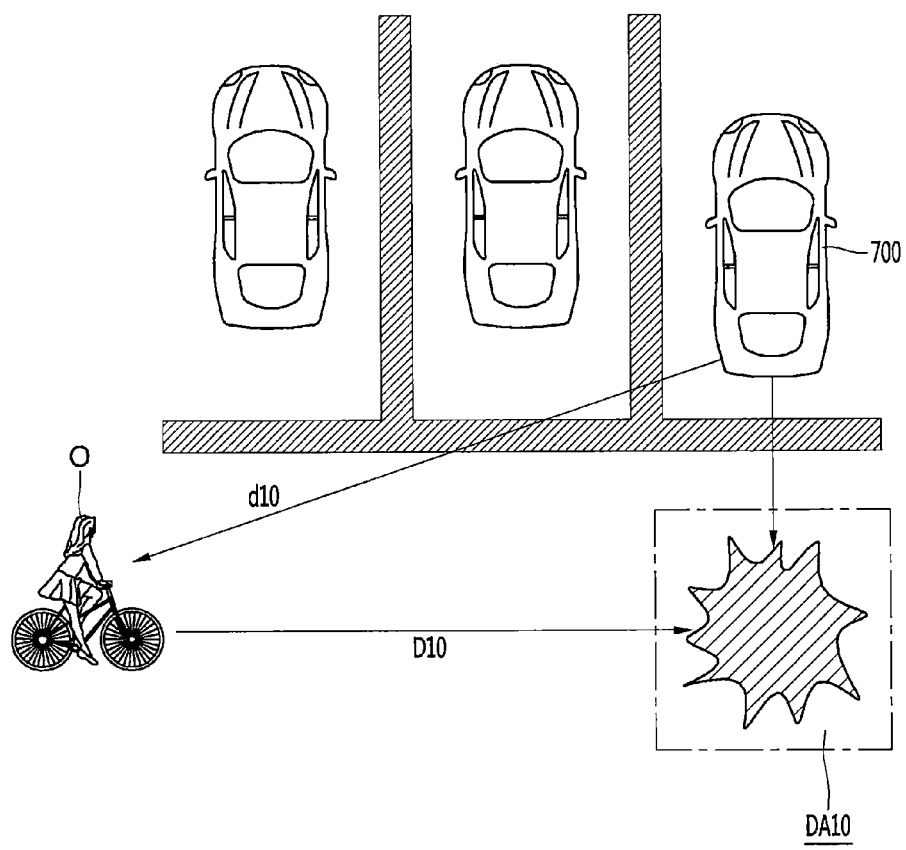
FIG. 15 represents another example of a notification situation according to an embodiment.

In the following, another particular embodiment is described with reference to FIGS. 15 to 16e. Referring to FIG. 15, when the vehicle 700 moves backward and an object 0 moves to the vehicle 700, there is a collision risk. Thus, when the vehicle moves backward, the driver assistance apparatus 100 can display an appropriate indicator according to the positional relationship with the notification target to assist in safe and smooth travel.

The driver assistance apparatus 100 can determine to be a moving-backward situation and search for a corresponding indicator, if a reverse gear signal is detected from sensor information. For example, the driver assistance apparatus 100 can extract an indicator that represents "Watch out backward movement" and "direction of backward movement", or an indicator that represents a recommended route.

In addition, the driver assistance apparatus 100 can detect a notification target and then determine an indicator display method according to the positional relationship with the notification target. Specifically, the driver assistance apparatus 100 can determine an indicator display area and a phase according to the direction of backward movement of the vehicle, the position of the notification target and the direction of movement. For example, it is possible to determine an area where the direction of backward movement of the vehicle crosses the notification target, to be a tenth indicator display area DA10.

In addition, an indicator phase may be corrected in consideration of the view direction of the notification target. Specifically, referring to FIG. 16a, when it is detected that the notification target O moves to the left, the driver assistance apparatus 100 can consider the direction of movement as the view direction and determine the phase of the tenth indictor i10 to correspond to the direction of movement.

When it is detected that a positional relation varies according to the movement of a vehicle, the driver assistance apparatus 100 can also correct a phase accordingly. Specifically, referring to FIG. 16b, the driver assistance apparatus 100 can lock the previous phase of the tenth indicator i10 even when the direction of backward movement is changed. That is, the driver assistance apparatus 100 can control a phase so that the notification target O sees the tenth indicator i10 of the same phase irrespective of the movement of the vehicle.

Also, if it is detected that a positional relationship varies according to the movement of the notification target O, the driver assistance apparatus 100 can correct a phase accordingly. Specifically, referring to FIG. 16c, the driver assistance apparatus 100 can enable the phase of an eleventh indicator i11 to be displayed as the left rear, as the direction of movement of the notification target O is changed to the left rear.

Also, if it is detected that a positional relationship varies according to the movement of the notification target O, the driver assistance apparatus 100 can change notification information accordingly to change an indicator image as well. Specifically, referring to FIG. 16d, if it is detected that the distance to the notification target decrease and the vehicle has stopped, the driver assistance apparatus 100 can change and display to a twelfth indicator i12 that represents a recommended route.

Figure 16A:
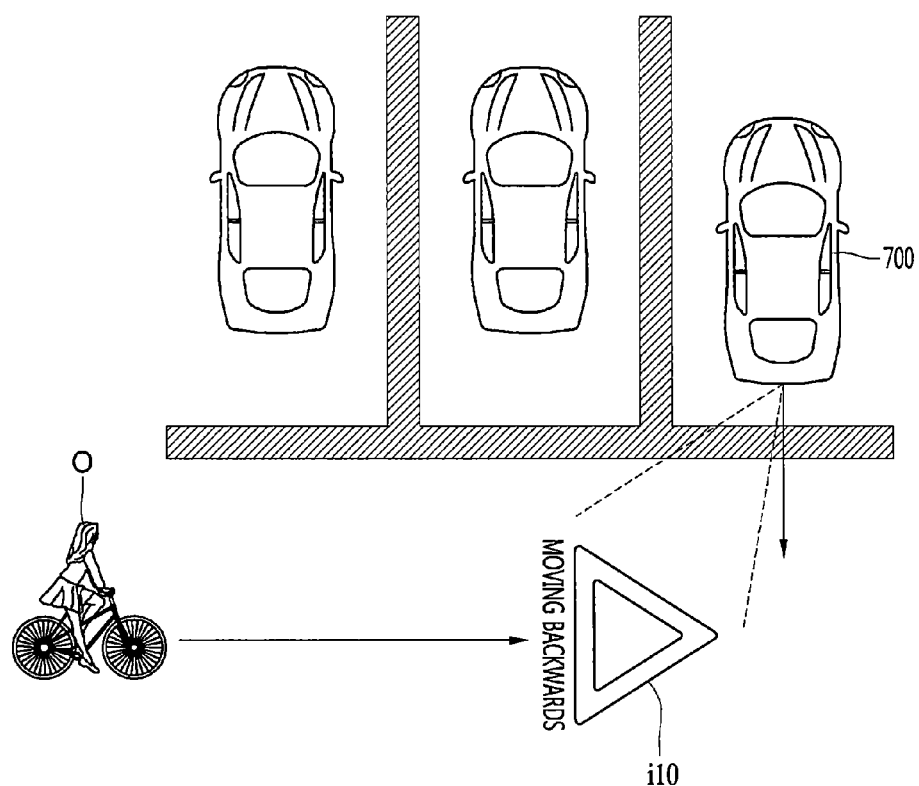
FIGS. 16a to 16e represent methods of displaying indicators in various backward situations according to embodiments.
Figure 16B:
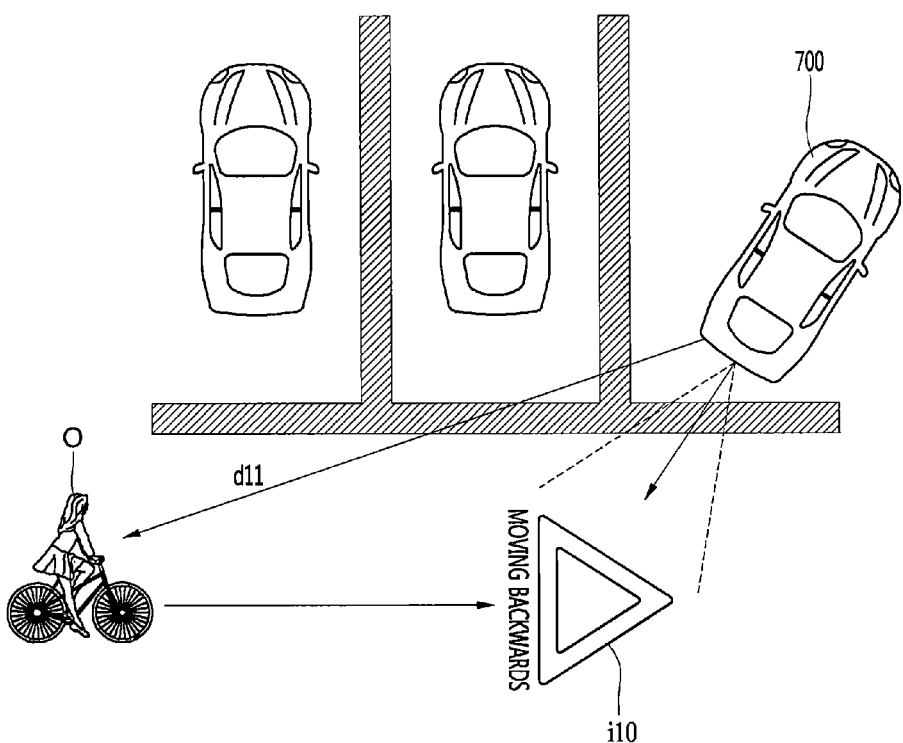
Figure 16C:
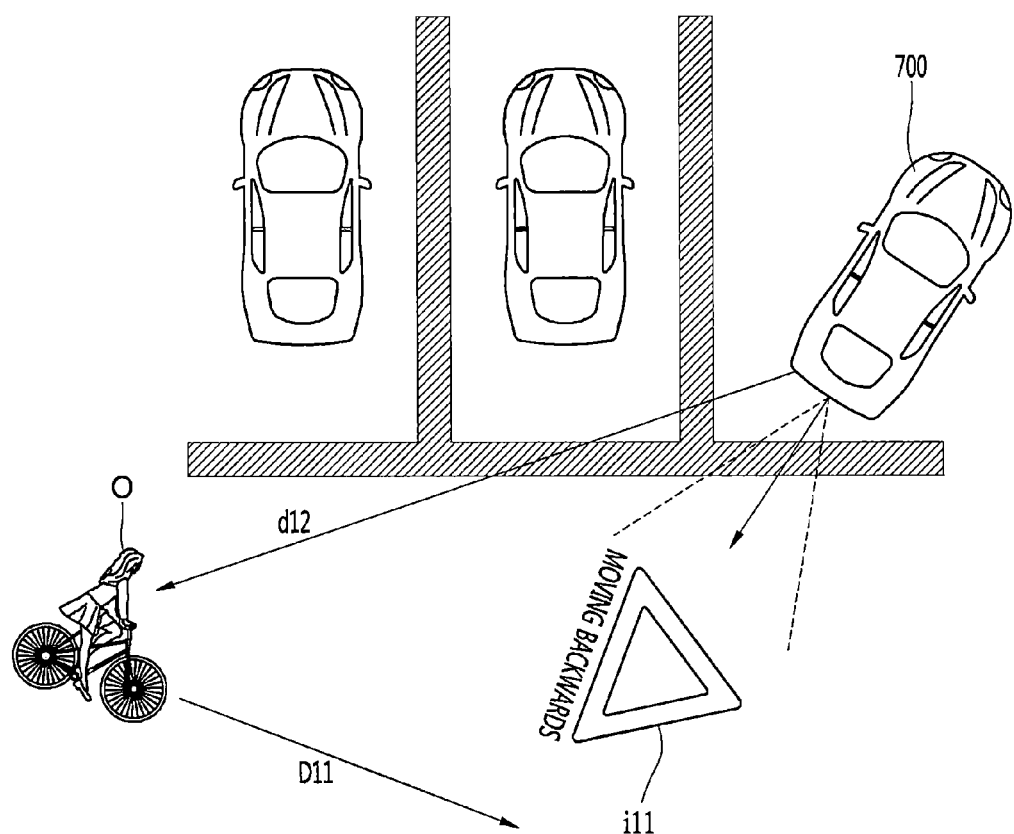
Figure 16D:
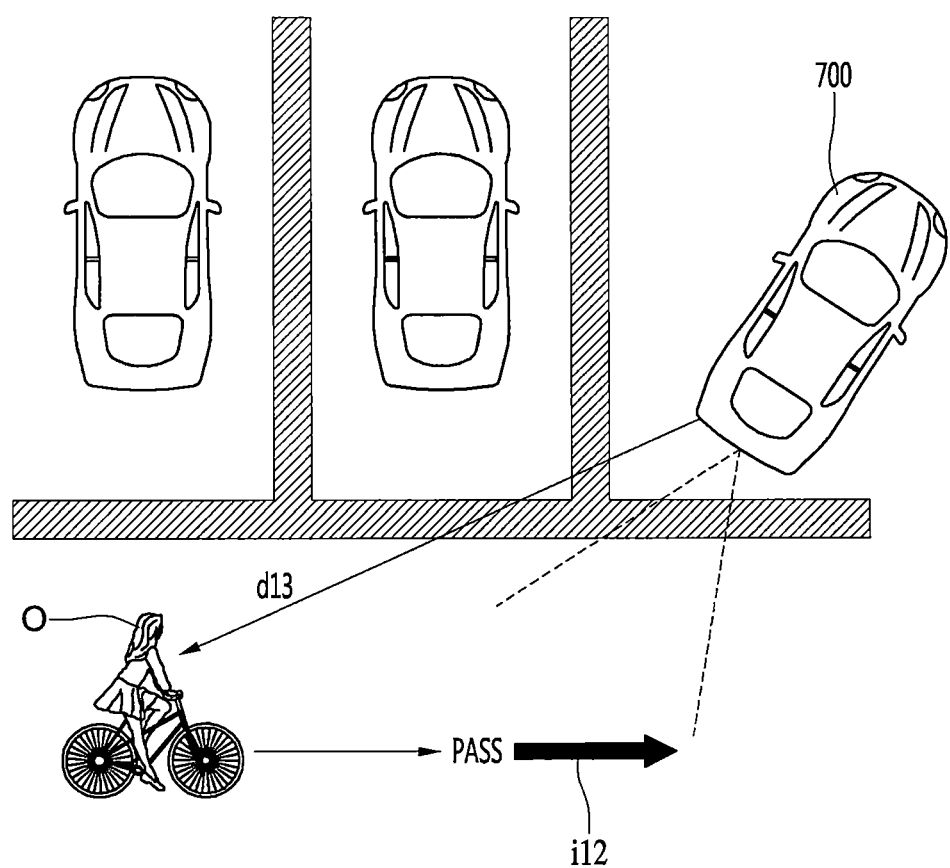
Figure 16E:
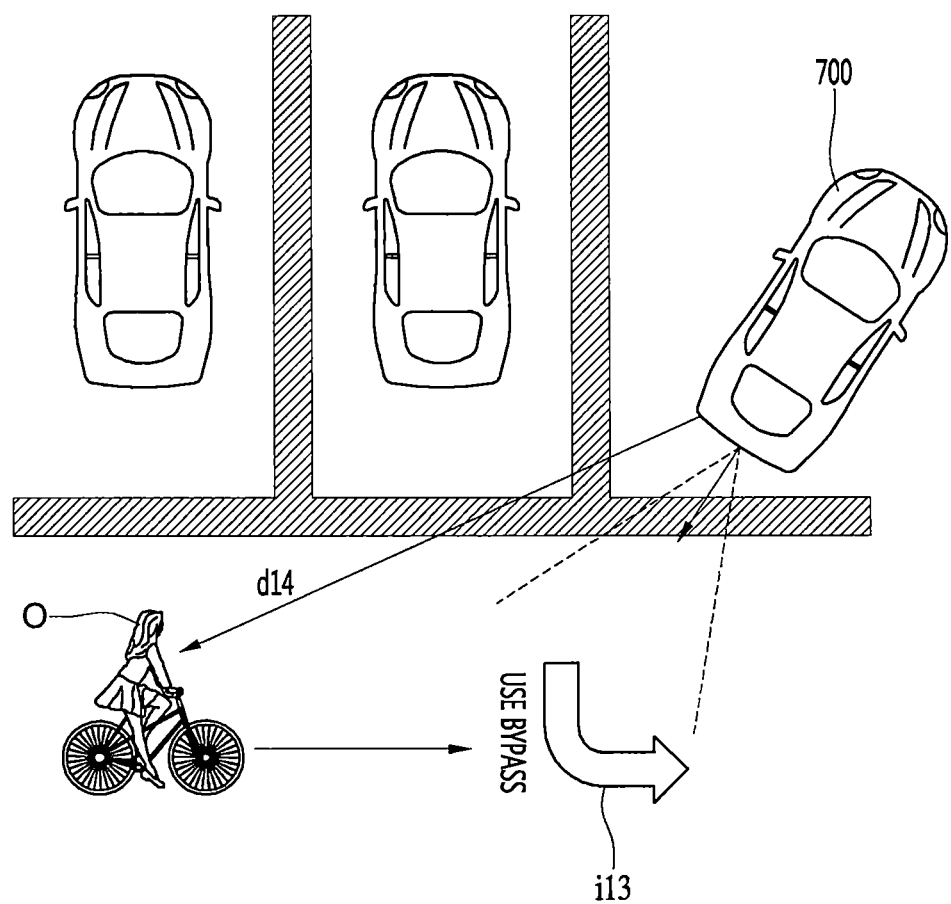
Figure 17A:
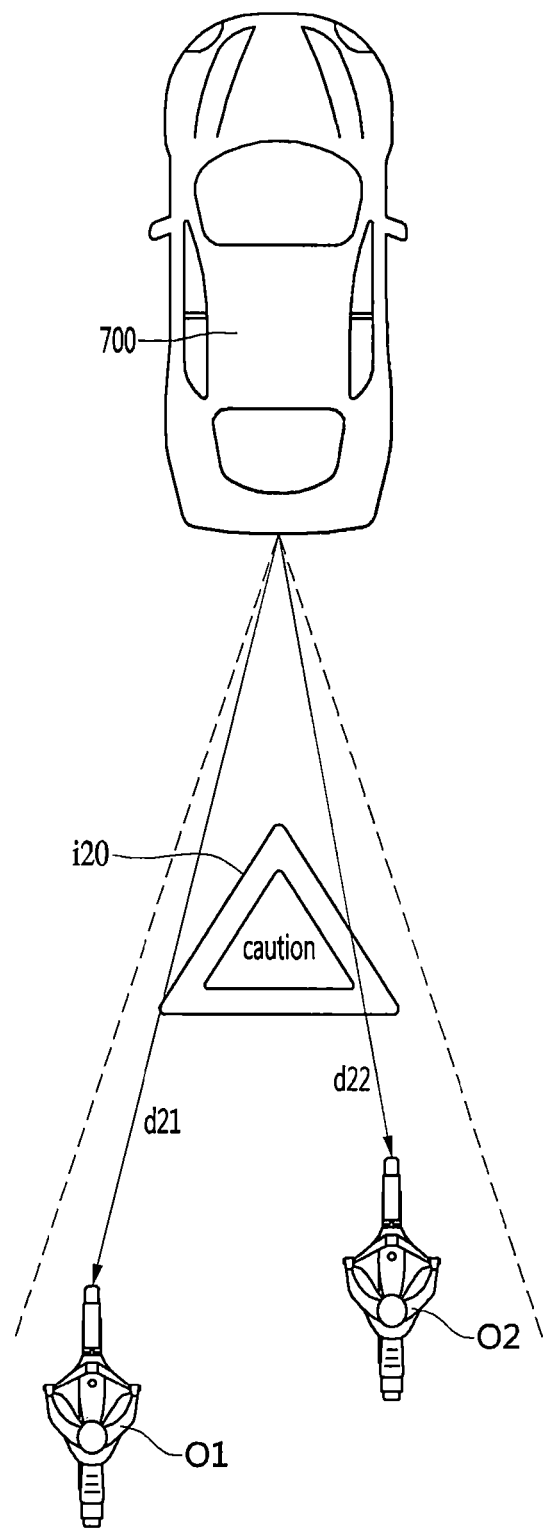
FIGS. 17a to 17d represent methods of displaying indicators in various notification situations in which there is a plurality of objects around a vehicle according to an embodiment.
Figure 17B:
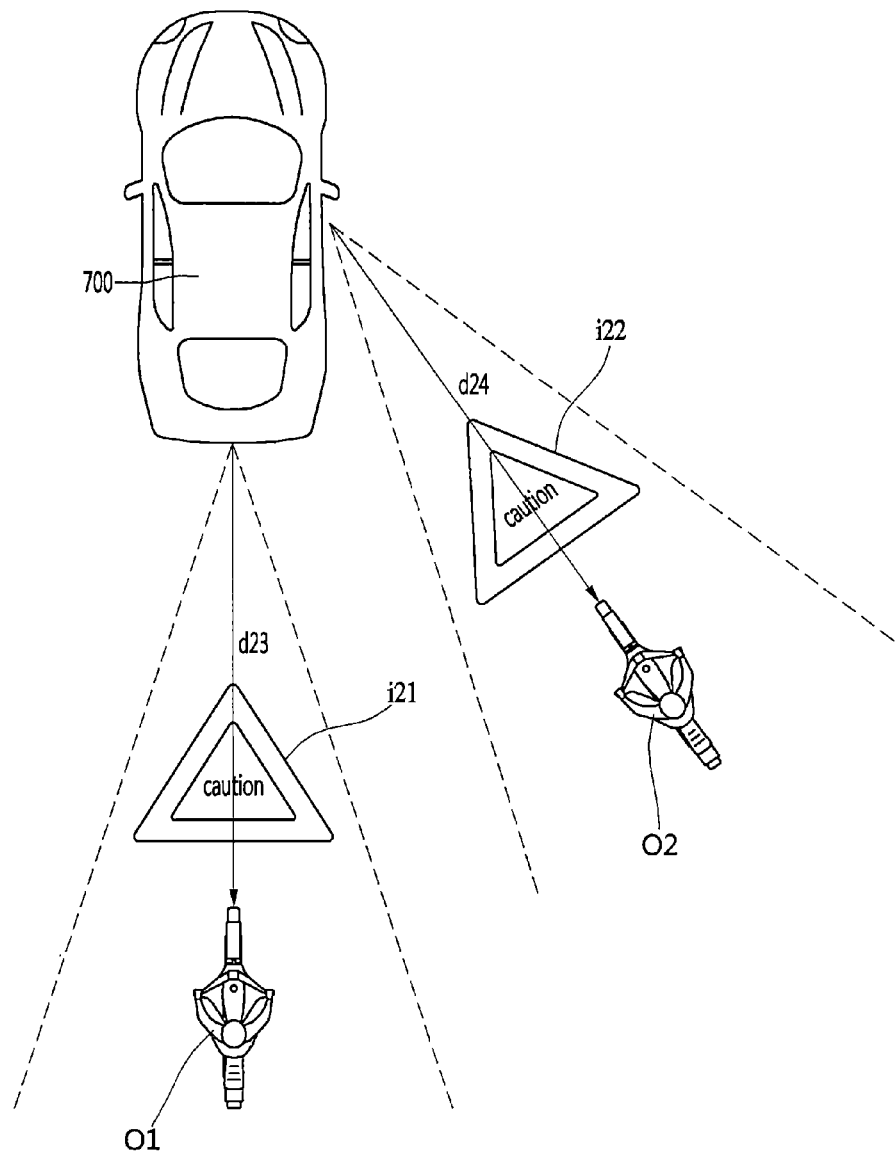
Figure 17C:
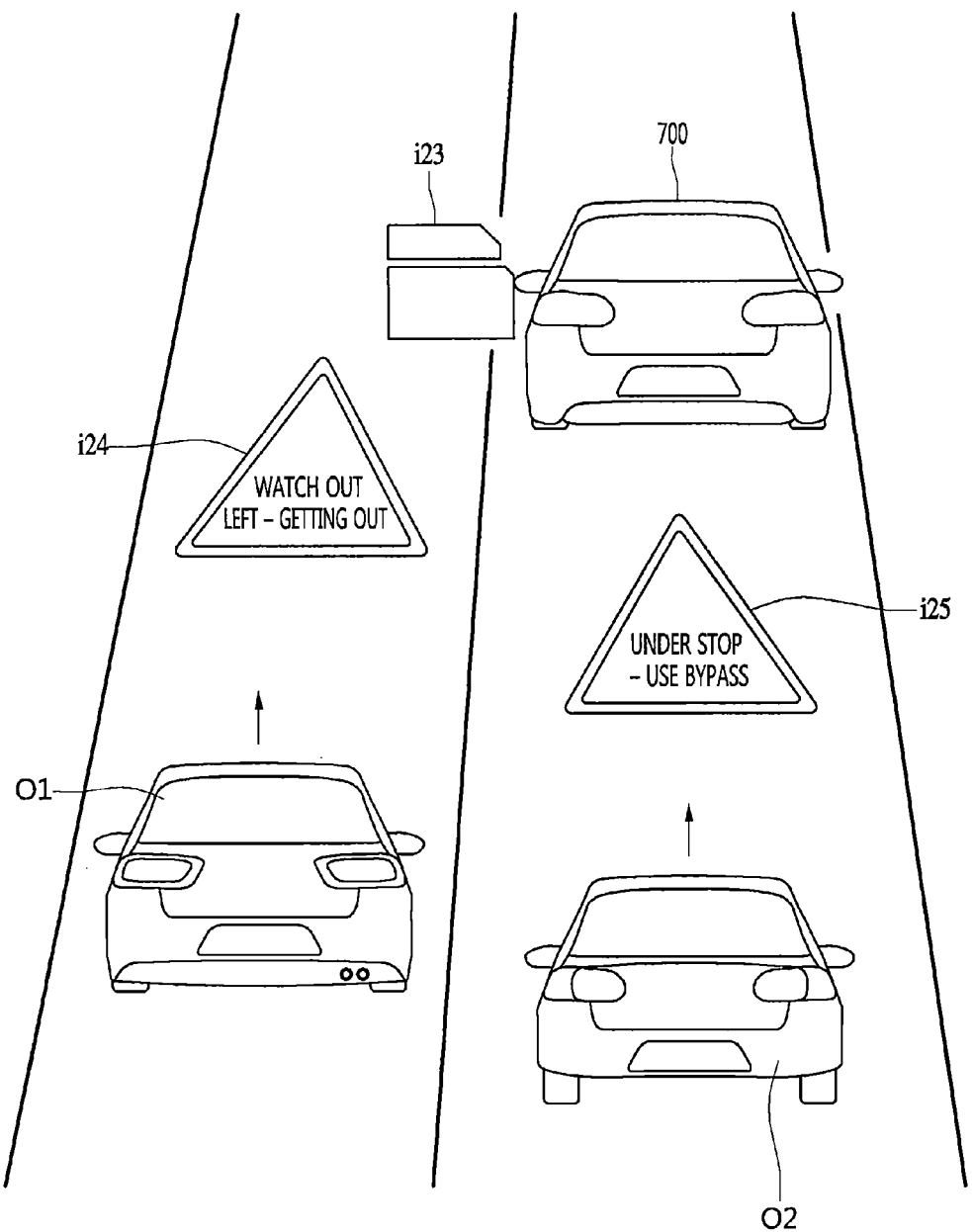
Figure 17D:
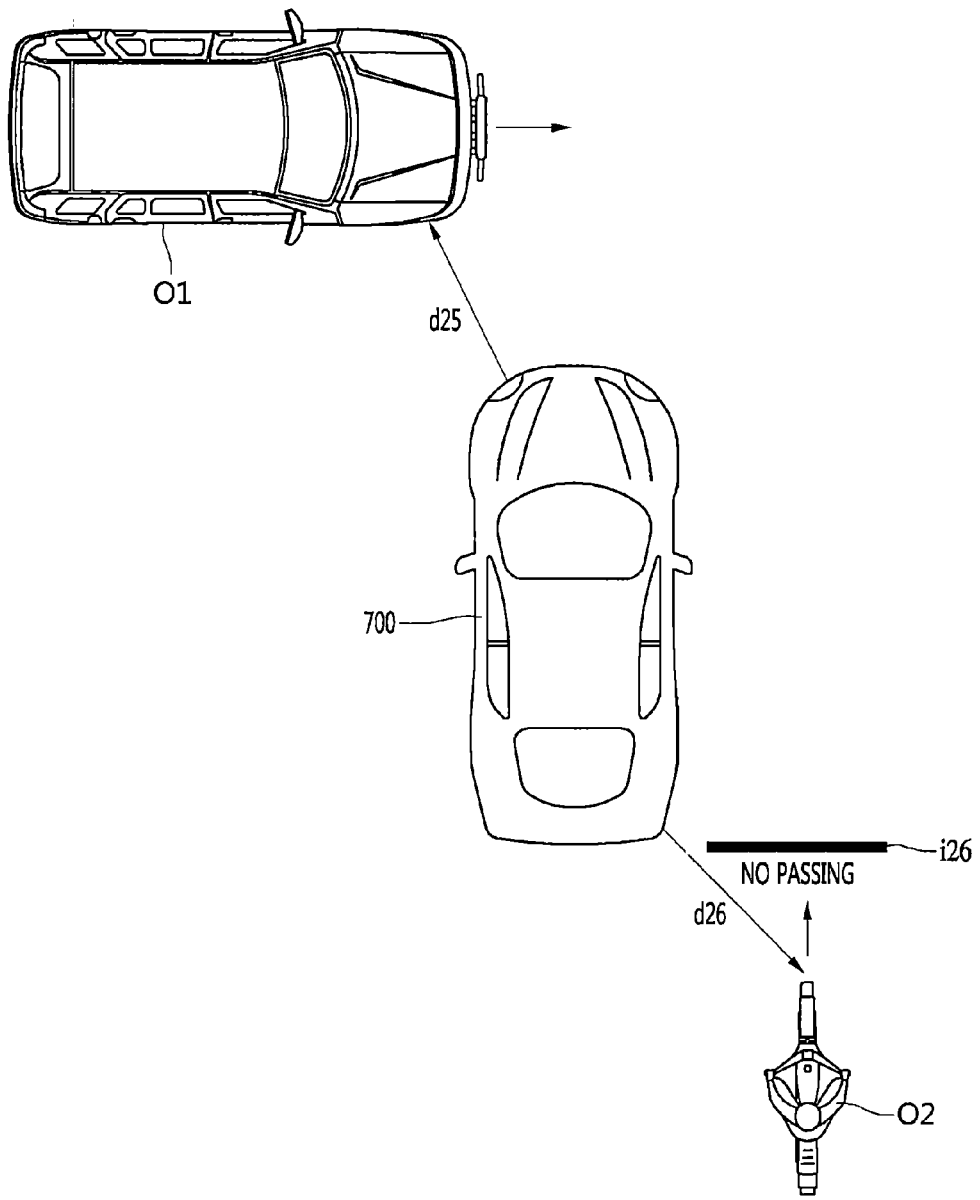

Referring FIG. 16e, if it is detected that the distance d14 to the notification target O decreases but the vehicle has not stopped moving backward, the driver assistance apparatus 100 can change and display to a thirteenth indicator i13 that represents a bypass route. That is, the driver assistance apparatus 100 can appropriately change and display an indicator according to the positional relationship with the notification target in a moving-backward situation to reduce a collision risk and assist in smooth travel between the notification target O and the vehicle.

In the following, another particular embodiment is described with reference to FIGS. 17a to 17d. When a plurality of notification targets O are detected, the driver assistance apparatus 100 can determine and display an indicator display method so that all the notification targets O recognize.

Specifically, when the positional relationships between the plurality of notification targets are similar, the driver assistance apparatus 100 can display a single indicator that may identify the plurality of notification targets. For example, referring to FIG. 17a, the driver assistance apparatus 100 can consider the rear area of the vehicle 700 as the same view area of a first notification target O1 and a second notification target O2 to designate the area as a display area, if it is detected that the first notification target O1 and the second notification target O2 are equally located behind the vehicle 700. In addition, the driver assistance apparatus 100 can display a twentieth indicator i20 on the designated display area to deliver a caution message to the notification targets O1 and O2.

Also, if the positional relationships between the plurality of notification targets are different from one another, the driver assistance apparatus 100 can display indicators to the plurality of notification targets, respectively. For example, referring to FIG. 17b, if the driver assistance apparatus 100 detects the first notification target O1 that moves from the rear of the vehicle 700 to the front, and the second notification target O2 that moves from the left of the vehicle 700 to the right front, it may display a twenty-first indicator i21 according to the positional relationship with the first notification target O1 and a twenty second indicator i22 according to the positional relationship with the second notification target O2.

The driver assistance apparatus 100 can also enable different indicators to be displayed by using different display methods to enable the plurality of notification targets to display different pieces of notification information according to a notification situation. For example, referring to FIG. 17c, the driver assistance apparatus 100 can display, on the left of the vehicle, twenty third and twenty fourth indicators i23 and i24 that represent information "watch out getting out", to the first notification target O1 that moves behind the vehicle on the left lane. The driver assistance apparatus 100 can display, behind the vehicle, a twenty fifth indicators i25 that represents information "watch out stop," to the second notification target O2 that moves behind the vehicle on the same lane.

The driver assistance apparatus 100 can display an indicator representing a collision risk to at least one of the notification targets O if the risk of colliding with a plurality of objects is detected. For example, referring to FIG. 17d, the driver assistance apparatus 100 can display a twenty sixth indicator i26 representing no passing to a second notification target O2, if it detects a first notification target O1 moving from the left front of the vehicle to the right and the second notification target O2 moving from the right rear of the vehicle to the front.

Figure 18:
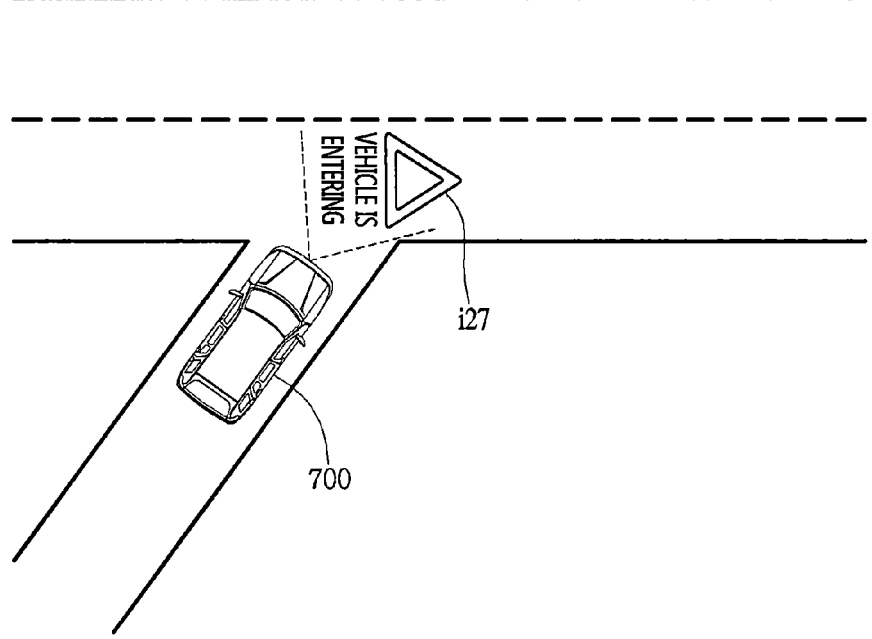
FIG. 18 represents a method of displaying an indicator in an interchange entrance situation according to an embodiment.

Also, when entering an interchange, the driver assistance apparatus 100 can display an indicator representing a lane change on the new lane to alert a vehicle that travels on the new lane. Specifically, referring to FIG. 18, the driver assistance apparatus 100 can previously display a twenty seventh indicator i27 representing "watch out vehicle entrance" on the highway, if it detects that the vehicle enters the highway.

Figure 19A:
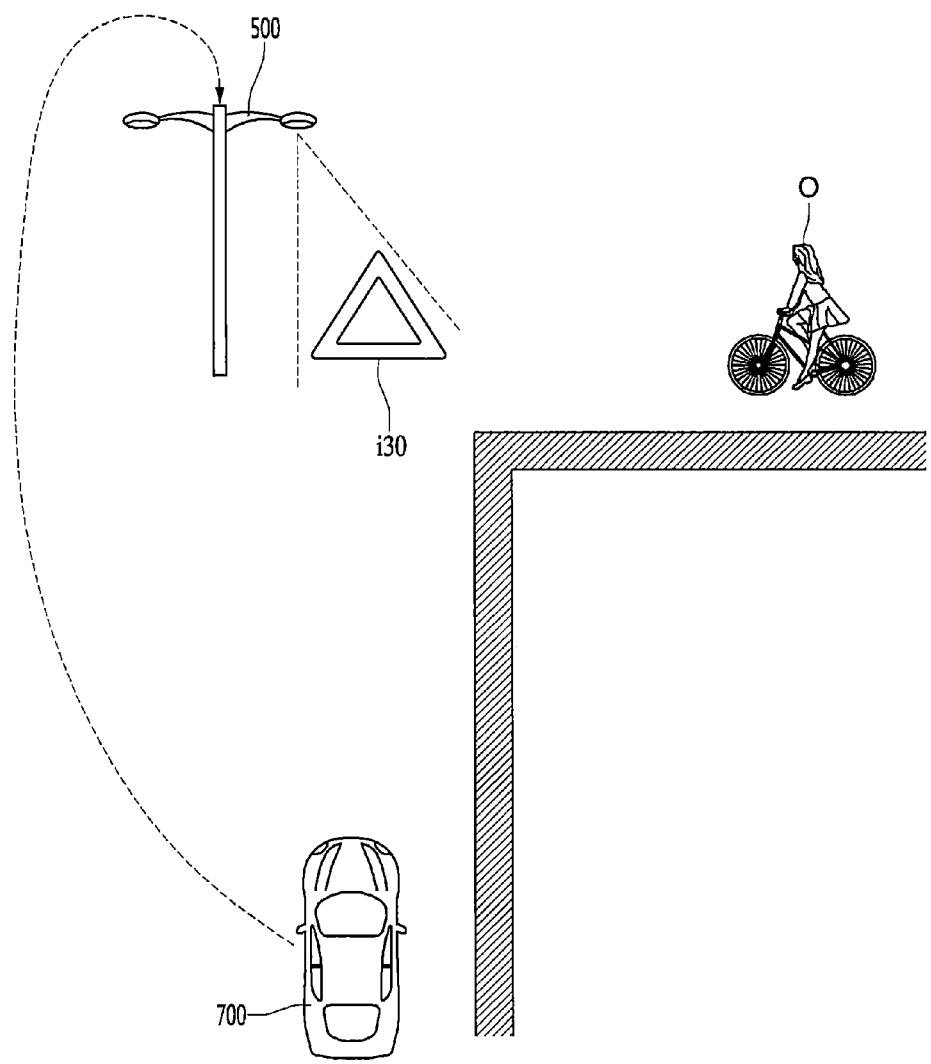
FIGS. 19a to 19c represent methods of displaying indicators by using communication according to. embodiments.

The driver assistance apparatus 100 can display an indicator by using various methods through the communication unit 120. In particular, referring to FIG. 19a, the driver assistance apparatus 100 can transmit indicator information to a traffic system 500 at an intersection through the communication unit 120 to notify a notification target O entering the intersection of intersection entrance through the communication unit 120 so that the traffic system 500 displays a thirtieth indicator i30 to the view area of the notification target O.

Figure 19B:
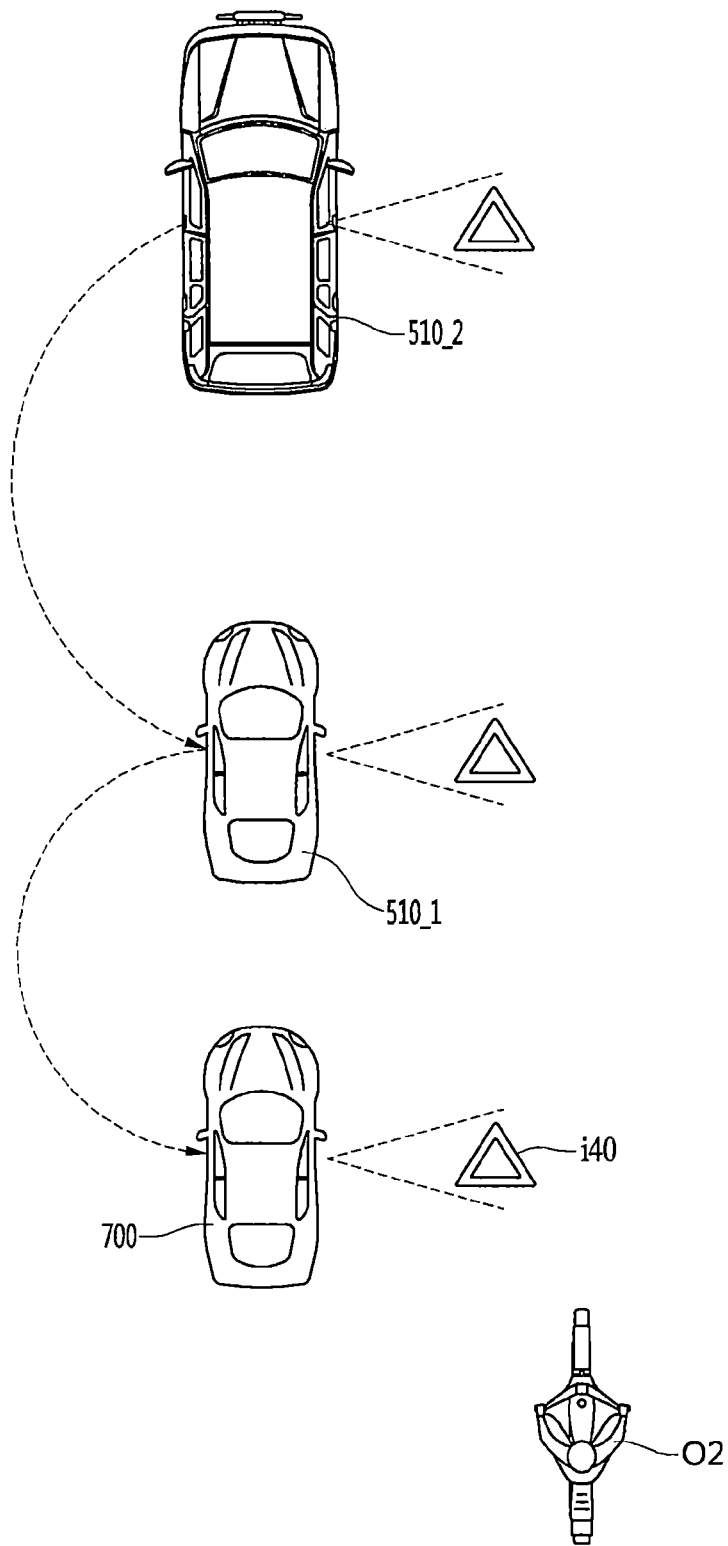

The driver assistance apparatus 100 can also display an indicator according to a display request if receiving an indicator display request signal through the communication unit 120. For example, referring to FIG. 19b, when a first another vehicle 510_1, a second another vehicle 510_2, and the present vehicle sequentially travel, the first another vehicle 510_1 may detect a caution situation, display a caution indicator and request that the second another vehicle 510_2 should display the caution indicator.

In addition, the second another vehicle 510_2 may display the caution indicator and request that the present vehicle should display the caution indicator. The driver assistance apparatus 100 can receive the indicator display request through the communication unit 120 and display a fortieth indicator i40 according to the display request.

Figure 19C:
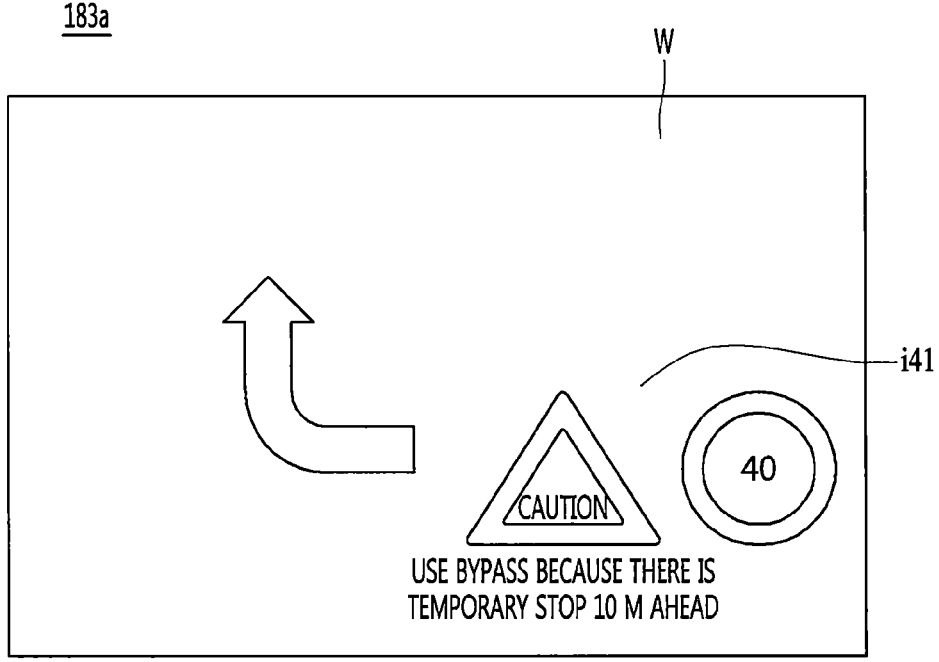

In this instance, the driver assistance apparatus 100 can also display indicator display request information inside the vehicle. Specifically, referring to FIG. 19c, the driver assistance apparatus 100 can display, on the display unit 183a, a forty first indicator i41 that represents caution information, bypass information, and recommended speed information. The driver assistance apparatus 100 can enable another vehicle to display an indicator. That is, the driver assistance apparatus 100 can transmit an indicator display request to the other vehicle through the communication unit 120 so that the other vehicle displays an indicator.

Figure 20:
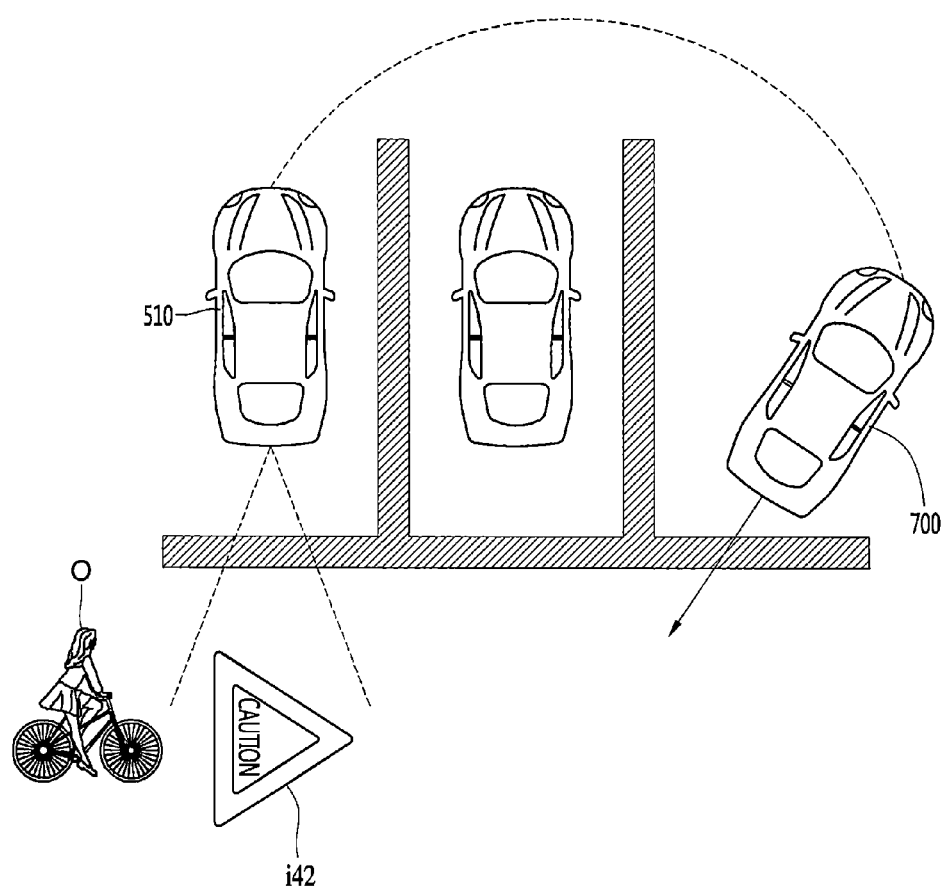
FIG. 20 represents a method of displaying an indicator through another vehicle according to an embodiment.

For example, referring to FIG. 20, the driver assistance apparatus 100 can transmit a forty second indicator i42 display request representing caution information to another vehicle close to a notification target O through the communication unit 120 so that the other vehicle 510 displays the forty second indicator i42 according to the display request.

Figure 21A:
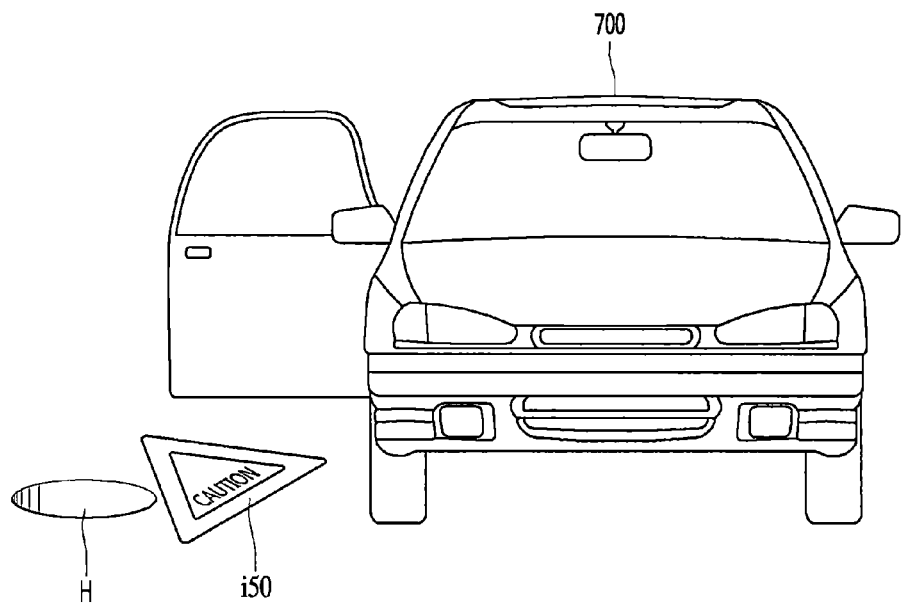
FIGS. 21a to 21b represent methods of displaying indicators when a passenger wants to get off the vehicle but there is an obstacle on the road surface according to embodiments.

The driver assistance apparatus 100 can output notification information in order to assist in getting out the vehicle even when there is no notification target O. Specifically, referring to FIG. 21a, the driver assistance apparatus 100 can display a fiftieth indicator i50 representing caution at the position of an obstacle H if it detects the obstacle H around the vehicle in a getting out situation. Accordingly, a passenger may safely get off.

Figure 21B:
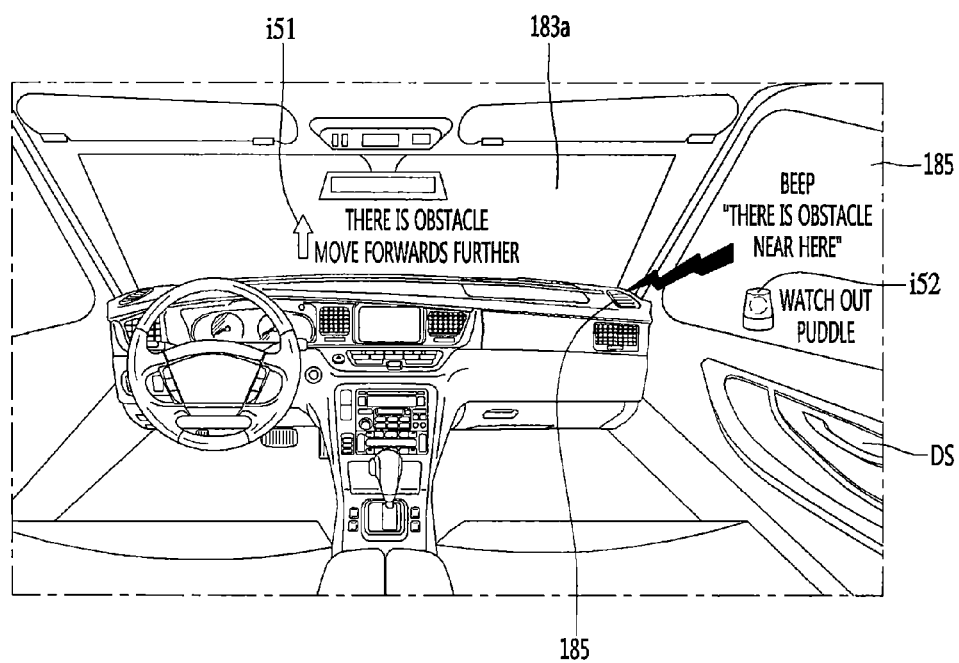

Also, referring to FIG. 21b, the driver assistance apparatus 100 can display, on a first display unit 183a, a fifty first indicator i51 representing that there is an obstacle, display, on a second display unit 183b close to the obstacle, a fifty second indicator i52 representing that there is the obstacle, and output a beep and message warning of the obstacle through the audio output unit 190. The driver assistance apparatus 100 can output certain notification information when the obstacle is another vehicle.

Figure 22A:
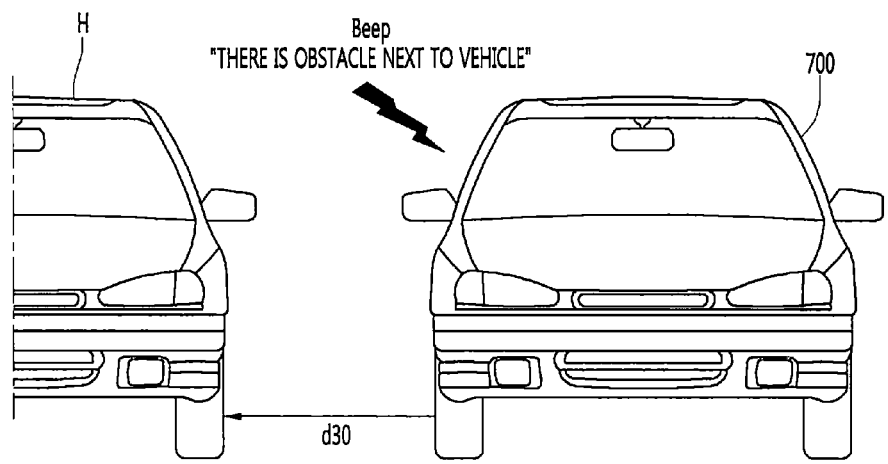
FIGS. 22a and 22d represent methods of outputting a notification when a passenger wants to get off the vehicle but there is an adjacent obstacle according to an embodiment.
Figure 22B:
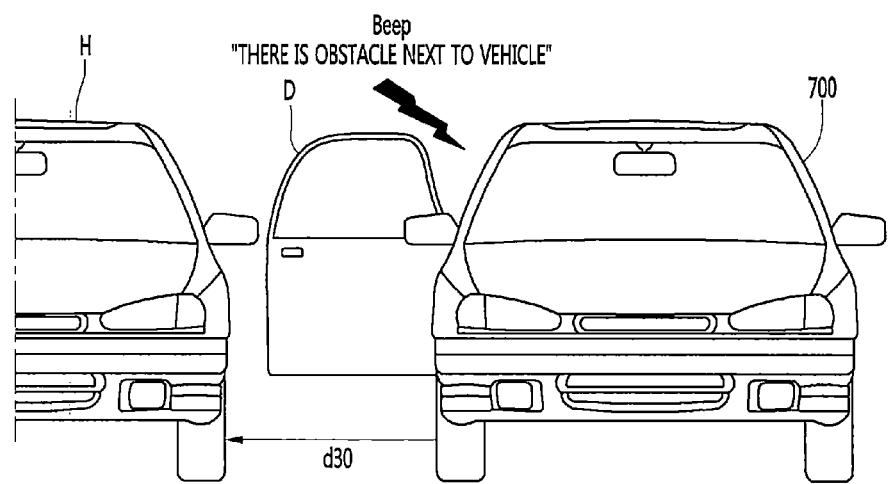

Specifically, referring to FIG. 22a, the driver assistance apparatus 100 can display a notification representing that there is an obstacle next to the vehicle, through the audio output unit 190 or the display unit 183, if it detects that a distance d30 is shorter than or equal to a certain distance. Also, referring to FIG. 22b, the driver assistance apparatus 100 can control so that the door of the vehicle opens within the distance d30. For example, the driver assistance apparatus 100 can transmit a vehicle door locking signal through the interface unit 130 so that the door of the vehicle opens within the distance d30.

Figure 22C:
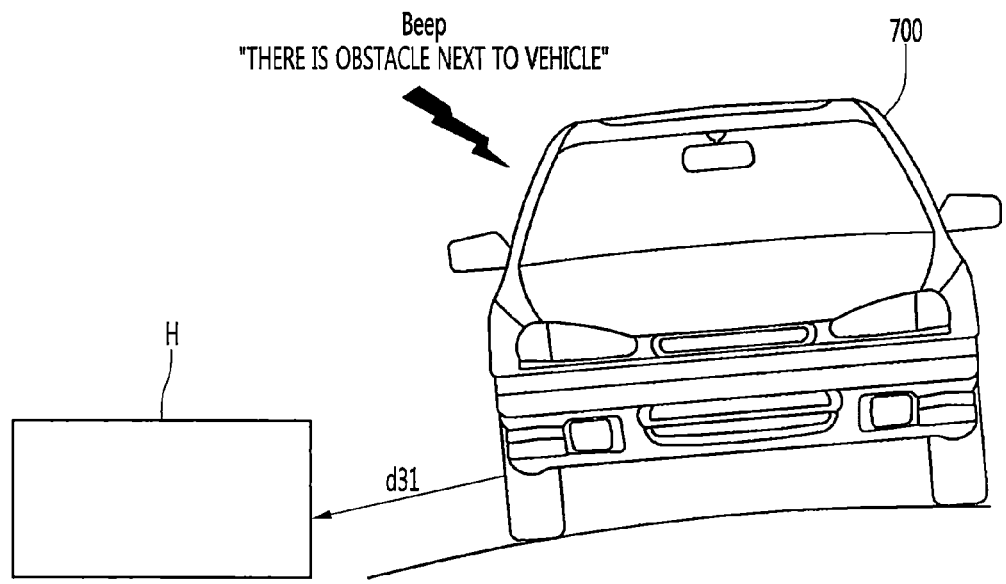
Figure 22D:
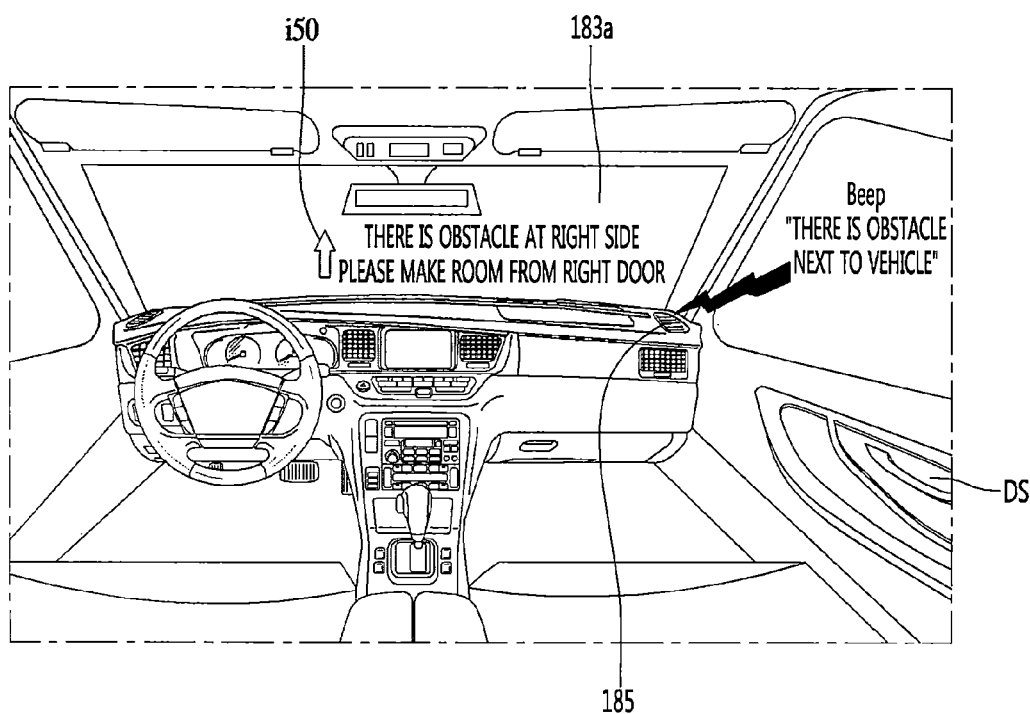

Also, referring to FIG. 22c, the driver assistance apparatus 100 can detect whether the door of the vehicle collides with an obstacle, such as a curb when the vehicle tilts. In this instance, referring to FIG. 22d, the driver assistance apparatus 100 can display, on a first display, the fiftieth indicator i50 representing that there is an obstacle H, to enable the driver to stop in another area. Also, it is possible to output, to a passenger to get off, a notification alerting that there is an obstacle, through a second display or the audio output unit 190.

Figure 23:
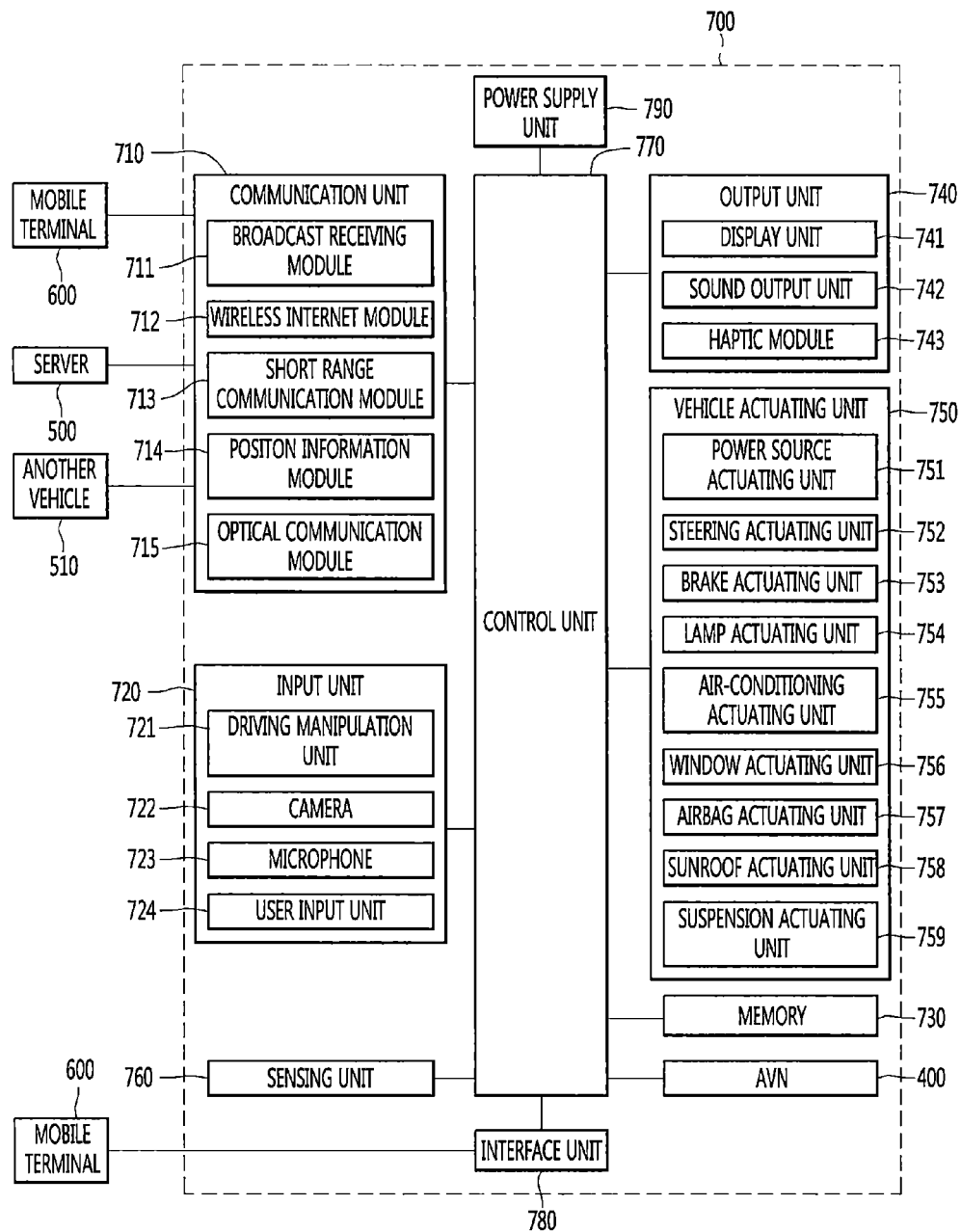
FIG. 23 is an example of an internal block diagram of a vehicle in FIG. 1 that includes the above-described driver assistance apparatus.

Referring to FIG. 23, the above-described driver assistance apparatus 100 can be included in the vehicle. Specifically, the vehicle 700 can include a communication unit 710, an input unit 720, a sensing unit 760, an output unit 740, a vehicle actuating unit 750, a memory 730, an interface unit 780, a control unit 770, a power supply unit 790, a driver assistance apparatus 100, and an AVN apparatus 400. Here, although it is described that the same units among the units of the driver assistance apparatus 100 and the units of the vehicle 700 are included in the vehicle, the embodiment is not limited thereto.

The communication unit 710 can include one or more modules that enable wireless communication between the vehicle and the mobile terminal 600, between the vehicle and an external sever 500, or between the vehicle and another vehicle 510. The communication unit 710 can include one or more modules that connect the vehicle to one or more networks. The communication unit 710 can include a broadcast receiving module 711, a wireless internet module 712, a short-range communication module 713, a position information module 714, and an optical communication module 715.

The broadcast receiving module 711 receives a broadcast signal or broadcast related information from an external broadcast management server through a broadcast channel. In this example, a broadcast includes a radio or TV broadcast. The wireless internet module 712 indicates a module for wireless internet access and may be built into or external to the vehicle. The wireless internet module 712 is configured to transmit/receive a wireless signal in a communication network according to wireless internet technologies.

The wireless internet technology can include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 712 transmits/receives data according to at least one wireless internet technology including internet technologies not listed above. For example, the wireless internet module 712 may exchange data with the external server 510 wirelessly. The wireless internet module 712 may receive weather information or road traffic information (e.g., TPEG) from the external server 510.

The short-range communication module 713 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies. Such a short-range communication module 713 may form a Wireless Area Network (WAN) to perform short-range communication between the vehicle and at least one external device. For example, the short-range communication module 713 may exchange data with the mobile terminal 600. The short-range module 713 may receive weather information or road traffic information (e.g., TPEG) from the mobile terminal 600. If a user gets in the vehicle, the mobile terminal 600 of the user and the vehicle may perform pairing on each other automatically or by the execution of an application by the user.

The position information module 714 is a module for acquiring the position of the vehicle and includes a GPS module as a typical example. For example, the vehicle may use a signal transmitted by a GPS satellite to acquire the position of the vehicle, when the GPS module is used.

The optical communication module 715 can include a light transmission unit and a light reception unit. The light reception unit may convert a light signal into an electrical signal to receive information. The light reception unit can include a photo diode (PD) for receiving light. The PD may convert light into an electrical signal. For example, the light reception unit may receive information on the front vehicle through light emitted from a light source that is included in the front vehicle.

The light transmission unit can include at least one light-emitting element for converting an electrical signal into a light signal. In this example, the light-emitting element may be a light-emitting diode (LED). The light transmission unit may convert an electrical signal into a light signal to transmit the light signal to the outside. For example, the light transmission unit may transmit the light signal to the outside through the on/off of the light-emitting element corresponding to a predetermined frequency. According to an embodiment, the light transmission unit can include a plurality of light-emitting element arrays. According to an embodiment, the light transmission unit may be integrated into a lamp that is installed at the vehicle. For example, the light transmission unit may be at least one of a headlight, a taillight, a stop lamp, a turn signal, and a sidelight. For example, the optical communication module 715 may exchange data with the other vehicle 520 through optical communication.

The input unit 720 can include the driving manipulation unit 721, a camera 722, a microphone 723, and a user input unit 724. The driving manipulation unit 721 receives a user input for driving the vehicle. The driving manipulation unit 721 can include a steering input mechanism 721A, a shift input mechanism 721D, an acceleration input mechanism 721C, and a brake input mechanism 721B (see FIG. 9).

The steering input mechanism 721A receives an input for the travelling direction of the vehicle from a user and may be a wheel so that a steering input may be performed by rotation. According to an embodiment, the steering input mechanism 721A may also be formed as a touch screen, touch pad or button.

The shift input mechanism 721D receives an input for the parking P, driving D, neutrality N, and rear movement R of the vehicle from the user. The shift input mechanism 721D can be formed in the form of a lever. According to an embodiment, the shift input mechanism 721D may also be formed as a touch screen, touch pad or button.

The acceleration input mechanism 721C receives an input for the acceleration of the vehicle from the user. The brake input mechanism 721B receives an input for the speed decrease of the vehicle from the user. The acceleration input mechanism 721C and the brake input mechanism 721B may be formed in the form of a pedal. According to an embodiment, the acceleration input mechanism 721C or the brake input mechanism 721B may also be formed as a touch screen, touch pad or button.

The camera 722 can include an image sensor and an image processing module. The camera 722 may process a still image or video that is obtained by the image sensor (e.g., CMOS or CCD). The image processing module may process the still image or video acquired by the image sensor to extract necessary information and transmit the extracted information to the processor 770. The vehicle can include the camera 722 that captures images in front of the vehicle or images around the vehicle, and the monitoring unit 150 that captures an image of the interior of the vehicle. The monitoring unit 150 may acquire an image of a passenger. The monitoring unit 150 may acquire the image of the passenger for biometrics.

In addition, the camera 722 may also be included in the driver assistance apparatus as described above. The microphone 723 may process an external sound signal into electrical data and the processed data may be used in various methods according to a function that is executed at the vehicle. The microphone 723 can convert a user's voice command into electrical data. The electrical data obtained through conversion may be transmitted to the control unit 770.

According to an embodiment, the camera 722 or the microphone 723 may also be a component that is included in the sensing unit 760, and not in the input 720. The user input unit 724 receives information from the user. When information is input through the user input unit 724, the control unit 770 may control the operation of the vehicle corresponding to the input information. The user input unit 724 can include a touch-type input mechanism or mechanical input mechanism. According to an embodiment, the user input unit 724 can be disposed at a region of a steering wheel. In this instance, a driver may manipulate the user input unit 724 with his or her finger, holding the steering wheel.

The sensing unit 760 senses a signal relating to the driving of the vehicle. Thus, the sensing unit 760 can include a wheel sensor, a speed sensor, a tilt sensor, a weight sensor, a heading sensor, a yaw sensor, a gyro sensor, a position module, a vehicle forward/backward movement sensor, a battery sensor, a fuel sensor, a tire sensor, a steering sensor by steering wheel rotation, a vehicle temperature sensor, a vehicle humidity sensor, an ultrasonic sensor, a radar, a Lidar, and so on.

Thus, the sensing unit 760 can acquire sensing signals for vehicle collision information, vehicle direction information, vehicle position information (GPS information), vehicle angle information, vehicle speed information, vehicle acceleration information, vehicle tilt information, vehicle forward/backward movement information, battery information, fuel information, tire information, vehicle lamp information, vehicle temperature information, vehicle humidity information, steering wheel rotation angle, and so on.

The sensing unit 760 may further include an acceleration pedal sensor, a barometric pressure sensor, an engine speed sensor, an Air Flow Sensor (AFS), an Air Temperature Sensor (ATS), a Water Temperature Sensor (WTS), a Throttle Position Sensor (TPS), a TDC sensor, a Crank Angle Sensor (CAS), and so on. The sensing unit 760 can include a biometric recognition information sensing unit.

The biometric recognition information sensing unit senses and acquires biometric recognition information on a passenger. The biometric recognition information can include fingerprint information, iris-scan information, retina-scan information, hand geometry information, facial recognition information, and voice recognition information. The biometric recognition information sensing unit can include a sensor that senses biometric recognition information of the passenger. In this instance, the monitoring unit 150 and the microphone 723 may operate as sensors. The biometric recognition information sensing unit may acquire hand geometry information and facial recognition information through the monitoring unit 150.

The output unit 740 is used for outputting information processed by the control unit 770 and can include the display unit 741, the sound output unit 742, and the haptic output unit 743. The display unit 741 may display information processed by the control unit 770. For example, the display unit 741 may display vehicle related information. In this example, the vehicle related information can include vehicle control information for direct control over the vehicle or driver assistance information for a driving guide for a driver. The vehicle related information can include vehicle state information that indicates the current state of the vehicle, or vehicle operation information relating to the operation of the vehicle.

The display unit 741 can include at least one of an LCD, a TFT LCD, an OLED, a flexible display, a 3D display, and an e-ink display. The display unit 741 may form a mutual layer structure with a touch sensor or be integrally formed to implement a touch screen. The touch screen may function as the user input unit that provides an input interface between the vehicle and the user, and also provide an output interface between the vehicle and the user. In this instance, the display unit 741 can include a touch sensor sensing a touch of the display unit 741 to be capable of receiving a control command by the touch. Accordingly, when the display unit 741 is touched, the touch sensor senses the touch, and the control unit 770 may generate, based on the touch, a control command corresponding to the touch. A thing input by the touch may be a letter, a number, or a menu item that may be instructed or designated in various modes.

The display unit 741 can include a cluster so that a driver may see vehicle state information or vehicle operation information simultaneously with driving. The cluster may be located on the dashboard. In this instance, the driver may see information displayed on the cluster, maintaining forward view. According to an embodiment, the display unit 741 may be implemented as a HUD. When the display unit 741 is implemented as the HUD, it is possible to output information through a transparent display that is installed on the windshield. Alternatively, the display unit 741 can include a projection module to output information by using image that is projected onto the windshield.

The sound output unit 742 converts an electrical signal from the control unit 770 into an audio signal and outputs the audio signal. Thus, the sound output unit 742 can include a speaker and so on. The sound output unit 742 may also output sound corresponding to the operation of the user input unit 724.

The haptic output unit 743 generates a haptic output. For example, the haptic output unit 743 may enable a steering wheel, a safety belt and a seat to vibrate so that a user can recognize an output. The vehicle actuating unit 750 may control the operations of various apparatuses of the vehicle. The vehicle actuating unit 750 can include a power source actuating unit 751, a steering actuating unit 752, a brake actuating unit 753, a lamp actuating unit 754, an air-conditioning actuating unit 755, a window actuating unit 756, an airbag actuating unit 757, a sunroof actuating unit 758, and a suspension actuating unit 759.

The power source actuating unit 751 may perform electronic control over the power source in the vehicle. For example, when the power source is a fossil fuel based engine, the power source actuating unit 751 may perform electronic control over the engine. Thus, it is possible to control the output torque of the engine. When the power source actuating unit 751 is the engine, it is possible to restrict the output torque of the engine to restrict the speed of the vehicle.

As another example, when the power source is an electricity based motor, the power source actuating unit 751 may control the motor. Thus, it is possible to control the speed, torque and so on of the motor. The steering actuating unit 752 may perform electronic control over a steering apparatus in the vehicle. Thus, it is possible to change the driving direction of the vehicle.

The brake actuating unit 753 may perform electronic control over a brake apparatus in the vehicle. For example, it is possible to control the operation of a brake installed at a wheel to decrease the speed of the vehicle. As another example, by enabling brakes disposed at the left wheel and the right wheel respectively to perform different operations, it is possible to adjust the driving direction of the vehicle to the left or to the right.

The lamp actuating unit 754 may control the turn on/off of lamps that are disposed inside and outside the vehicle. Also, it is possible to control the intensity, direction and so on of light emitted from the lamp. For example, it is possible to control a turn signal lamp, a brake lamp, and so on.

The air-conditioning actuating unit 755 may perform electronic control over an air conditioner in the vehicle. For example, when the temperature inside the vehicle is high, it is possible to operate the air conditioner so that cold air is supplied into the vehicle. The window actuating unit 756 may perform electronic control over a window apparatus in the vehicle. For example, it is possible to open or close left and right windows of the vehicle.

The airbag actuating unit 757 may perform electronic control over an airbag apparatus in the vehicle. For example, it is possible to operate an airbag in a risky situation. The sunroof actuating unit 758 may perform electronic control over a sunroof apparatus in the vehicle. For example, it is possible to open or close the sunroof.

The suspension actuating unit 759 may perform electronic control over a suspension apparatus in the vehicle. For example, when the road surface is uneven, it is possible to control a suspension apparatus to reduce the vibration of the vehicle. The memory 730 is electrically connected to the control unit 770. The memory 770 may store fundamental data on units, control data for operation control over the units, and input and output data. The memory 790 may be various storage devices, such as a ROM, RAM, EPROM, flash drive, and hard drive that are hardware. The memory 730 may store various pieces of data for the overall operations of the vehicle, such as programs for processing or controlling by the control unit 770.

The interface unit 780 may function as a path to various kinds of external devices that are connected to the vehicle. For example, the interface unit 780 can include a port connectable to the mobile terminal 600 and be connected to the mobile terminal 600 through the port. In this instance, the interface unit 780 may exchange data with the mobile terminal 600. The interface unit 780 may function as a path through which electrical energy is supplied to the mobile terminal 600. When the mobile terminal 600 is electrically connected to the interface unit 780, the interface unit 780 supplies electrical energy supplied from the power supply unit 790 to the mobile terminal 600 according to the control of the control unit 770.

The control unit 770 can control the overall operation of each unit in the vehicle. The control unit 770 can be named an electronic control unit (ECU). Such a control unit 770 can execute a function corresponding to a transmitted signal, according to the execution signal transmission of the driver assistance apparatus 100.

The control unit 770 may be implemented by using at least one of an ASIC, a DSP, a DSPD, a PLD, an FPGA, a processor, a controller, a micro-controller, a microprocessor, and other electrical units for executing functions. The control unit 770 can perform the role of the above-described processor 170. That is, the processor 170 of the driver assistance apparatus 100 can be set directly to the control unit 770 of the vehicle. In such an embodiment, it may be understood that the driver assistance apparatus 100 refers to some components of the vehicle. Alternatively, the control unit 770 can also control components to transmit information requested by the processor 170.

The power supply unit 790 can supply power required for the operation of each component according to the control of the control unit 770. In particular, the power supply unit 770 may receive power from a battery in the vehicle. The AVN apparatus 400 may exchange data with the control unit 770. The control unit 770 may receive navigation information from the AVN apparatus 400 or a separate navigation apparatus. In this example, the navigation information can include set destination information, route information according to the destination, vehicle driving related map information, or vehicle position information.

The driver assistance apparatus according to the embodiment can determine an indicator I and a method of showing an indicator according to a notification situation and a positional relationship with a notification target when detecting that there is an object around a vehicle and a notification situation, output the indicator according to the determined method, notify the outside of a dangerous situation to prevent an accident, and ask for cooperation to enable a driver to smoothly drive.

Further, when a notification target moves or the present vehicle moves and thus the positional relationship between the vehicle and the notification target varies, the driver assistance apparatus according to the embodiment may change an indicator display method to enhance notification target's indicator identification level to accurately deliver notification information to the other party. The driver assistance apparatus according to the embodiment may display notification information even inside the vehicle to enhance the safety and convenience of a passenger.

Various embodiments described herein may be implemented in a computer-readable medium using, for example, software, hardware, or some combination thereof For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For a software implementation, the embodiments such as procedures and functions may be implemented together with separate software modules each of which performs at least one of functions and operations. The software codes can be implemented with a software application written in any suitable programming language. Also, the software codes may be stored in the memory and executed by the controller. Thus, the components shown in figures have sufficient structure to implement the appropriate algorithms for performing the described functions.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A driver assistance apparatus in a vehicle, the driver assistance apparatus comprising:
    a sensor configured to detect obstacles around the vehicle;
    a plurality of indicator output units disposed at different positions on the vehicle; and
    a processor configured to:
    detect an obstacle around the vehicle and a positional relationship between the vehicle and the obstacle,
    selectively control the indicator output units to display an indicator outside the vehicle at a position and with a display characteristic, based on the detected positional relationship, wherein a phase of the indicator corresponds to a direction of movement of the obstacle,
    detect the positional relationship between the vehicle and the obstacle changing, and
    selectively control the indicator output units to change at least one of the position and the display characteristic of the indicator based on the changing positional relationship.

2. The driver assistance apparatus according to claim 1, wherein the processor is configured to control left indicator output units on a left side of the vehicle and right indicator output units on a right side of the vehicle to display the indicator at the position in a left area outside the vehicle and a right area outside the vehicle, respectively.

3. The driver assistance apparatus according to claim 2, wherein the processor is configured to control a first indicator output unit to output a first partial indicator and a second indicator output unit to output a second partial indicator to display the indicator outside the vehicle.

4. The driver assistance apparatus according to claim 1, wherein the processor is configured to control the indicator output units to display a plurality of indicators in different areas outside the vehicle.

5. The driver assistance apparatus according to claim 1, wherein the processor is configured to control the indicator output units to change the phase of the indicator based on a change of the direction of movement of the obstacle.

6. The driver assistance apparatus according to claim 1, further comprising:
    a display disposed within the vehicle and configured to display the indicator on glass of the vehicle.

7. The driver assistance apparatus according to claim 1, wherein the processor is configured to:
    detect a notification situation indicating the indicator is to be displayed,
    determine notification information to be notified to the obstacle according to the notification situation, and
    display the indicator representing the notification information.

8. The driver assistance apparatus according to claim 1, wherein the processor is configured to change the display characteristic of the indicator by changing at least one of an indicator display position, size, saturation, color, and an indicator image of the indicator.

9. The driver assistance apparatus according to claim 1, wherein the processor is configured to change the position of the indicator according to the direction of movement of the obstacle.

10. The driver assistance apparatus according to claim 1, wherein the processor is configured to change the display characteristic of the indicator by changing a size of the indicator according to a changing distance between the obstacle and the vehicle.

11. The driver assistance apparatus according to claim 1, wherein the processor is configured to change the display characteristic of the indicator by changing the phase of the indicator according to the direction of movement of the obstacle.

12. The driver assistance apparatus according to claim 1, wherein the processor is configured to display the indicator as an image according to a variation in the detected positional relationship.

13. The driver assistance apparatus according to claim 1, wherein the processor is configured to:
    determine a passenger is getting out of the vehicle, and
    control the indicator output units to display the indicator to the obstacle when the obstacle is approaching a direction of the passenger getting out of the vehicle.

14. The driver assistance apparatus according to claim 13, wherein the processor is configured to control the indicator output units to change the display characteristic of the indicator by decreasing a display size of the indicator according to a decrease in distance between the vehicle and the obstacle.

15. The driver assistance apparatus according to claim 13, wherein the processor is configured to control the indicator output units to display the indicator to represent a recommended route for passing the vehicle, if a distance between the obstacle and vehicle is shorter than or equal to a certain distance.

16. The driver assistance apparatus according to claim 13, wherein the processor is configured to control the indicator output units to:
    display a first indicator representing a warning to the passenger getting out of the vehicle in a direction of the passenger getting out the vehicle, and
    display a second indicator representing a bypass route in a rear area of the vehicle.

17. The driver assistance apparatus according to claim 13, further comprising:
    a display configured to display the indicator on a side glass of the vehicle.

18. The driver assistance apparatus according to claim 1, wherein the processor is configured to:
    determine the vehicle is moving backwards in response to a reverse gear change signal,
    control the indicator output units to display the indicator in the phase corresponding to the direction of movement of the obstacle, and correct the phase according to a variation in the direction of movement of the vehicle to continue to display the indicator in the phase corresponding to the direction of movement of the obstacle.

19. The driver assistance apparatus according to claim 1, wherein the processor is configured to control the indicator output units to display a single indicator to a plurality of obstacles or display different indicators to the plurality of obstacles.

20. The driver assistance apparatus according to claim 1, wherein the processor is configured to control the indicator output units to display the indicator to represent a lane change on a new lane when the vehicle enters an interchange.

* * * * *